United States Patent
Anvaripour et al.

(10) Patent No.: US 12,212,877 B2
(45) Date of Patent: Jan. 28, 2025

(54) CAMERA SETTINGS AND EFFECTS SHORTCUTS

(71) Applicant: Snap Inc., Santa Monica, CA (US)

(72) Inventors: Kaveh Anvaripour, Santa Monica, CA (US); Laurent Desserrey, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 5 days.

(21) Appl. No.: 17/937,980

(22) Filed: Oct. 4, 2022

(65) Prior Publication Data
US 2023/0344953 A1 Oct. 26, 2023

Related U.S. Application Data

(60) Provisional application No. 63/334,873, filed on Apr. 26, 2022.

(51) Int. Cl.
*H04N 5/262* (2006.01)
*H04N 23/63* (2023.01)

(52) U.S. Cl.
CPC ......... *H04N 5/2621* (2013.01); *H04N 23/631* (2023.01)

(58) Field of Classification Search
CPC .. H04N 5/2621; H04N 23/631; G11B 27/031; G11B 27/34
See application file for complete search history.

(56) References Cited

U.S. PATENT DOCUMENTS

| | | | |
|---|---|---|---|
| 11,335,088 B2 * | 5/2022 | Anvaripour | G06F 3/04845 |
| 2020/0344411 A1 * | 10/2020 | Cragg | H04N 23/64 |
| 2021/0303855 A1 * | 9/2021 | Anvaripour | G06F 3/013 |
| 2021/0304505 A1 | 9/2021 | Anvaripour et al. | |
| 2022/0207838 A1 * | 6/2022 | Anvaripour | G06F 3/04883 |
| 2022/0237914 A1 * | 7/2022 | Anvaripour | G06T 19/006 |
| 2022/0375137 A1 | 11/2022 | Anvaripour et al. | |
| 2022/0377033 A1 | 11/2022 | Anvaripour et al. | |
| 2023/0004278 A1 | 1/2023 | Anvaripour et al. | |

(Continued)

FOREIGN PATENT DOCUMENTS

WO 2023211660 11/2023

OTHER PUBLICATIONS

Alexandra. (2021). How to find trending Reels songs on Instagram? Here are 7 places. Preview App. https://thepreviewapp.com/how-to-find-trending-reels-songs-instagram/ (Year: 2021).*

(Continued)

*Primary Examiner* — Antoinette T Spinks
(74) *Attorney, Agent, or Firm* — Schwegman Lundberg & Woessner, P.A.

(57) ABSTRACT

Disclosed is a method for providing custom visual settings on a device including a display and at least one camera. The method comprises displaying a video on the display of the device, the video including data specifying the camera settings and visual effects that were applied during capture of the video, displaying a camera effects shortcut, receiving user selection of the camera effects shortcut, and, based on receipt of user selection of the camera effects shortcut, displaying, on the display, a video feed from the at least one camera on the with the visual effects and camera settings specified by the data.

17 Claims, 17 Drawing Sheets

(56) References Cited

U.S. PATENT DOCUMENTS

2023/0254436 A1* 8/2023 Xie .................. G10H 1/368
348/239

OTHER PUBLICATIONS

Writtenhouse, S., & Writtenhouse, S. (Apr. 18, 2021). How to use the Instagram Effect Gallery for stories. iDownloadBlog.com. https://www.idownloadblog.com/2021/04/19/instagram-effect-gallery-stories/ (Year: 2021).*
"International Application Serial No. PCT/US2023/017686, International Search Report mailed Jul. 14, 2023", 3 pgs.
"International Application Serial No. PCT/US2023/017686, Written Opinion mailed Jul. 14, 2023", 6 pgs.

* cited by examiner

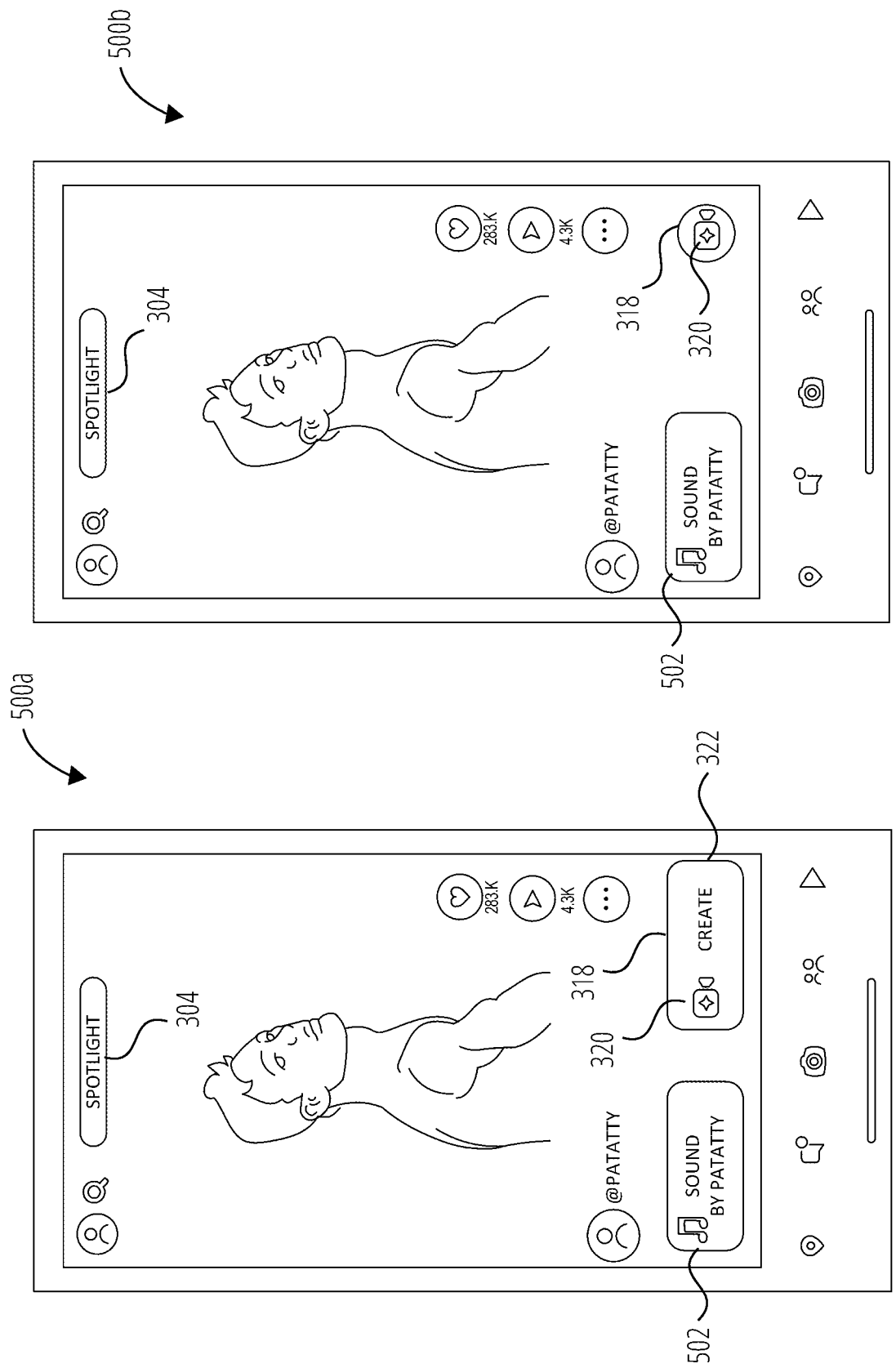

CAMERA SETTINGS AND EFFECTS SHORTCUTS

RELATED APPLICATION DATA

This application claims the benefit of U.S. Provisional Patent Application Ser. No. 63/334,873, filed on Apr. 26, 2022, the contents of which are incorporated herein by reference as if explicitly set forth.

BACKGROUND

Social networking applications provide a vehicle for the sharing of user content such as photos or videos. In some instances, the photos or videos may be supplemented by augmented reality or other effects that are generated live on a camera feed and displayed on the display of a mobile device for preview. The user may be able to select and manipulate effects to apply to the live camera feed, and when satisfied capture an image or record a video including the effects. The captured video or photo can then be shared on the social networking platform.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some nonlimiting examples are illustrated in the figures of the accompanying drawings in which:

FIG. 5A and FIG. 5B illustrate mobile device user interfaces according to some examples.

DETAILED DESCRIPTION

Figure 1:
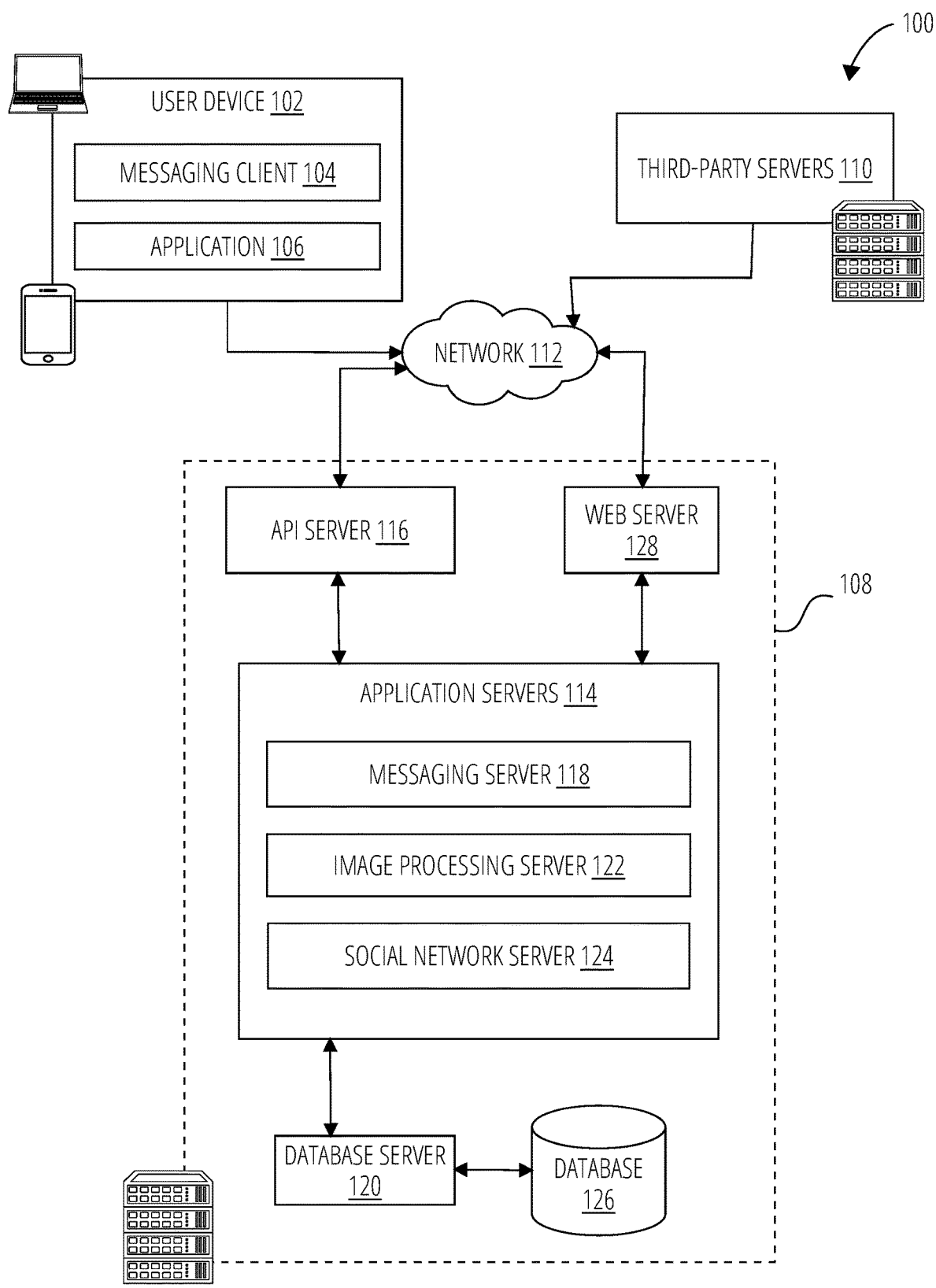
FIG. 1 is a diagrammatic representation of a networked environment in which the present disclosure may be deployed, in accordance with some examples.

Disclosed are systems and methods for providing a quick method and interface whereby a user of a messaging or social media application on a portable device can apply camera settings and effects, such as augmented reality (AR) effects, to the camera feed on their device.

As referred to herein, the term "augmented reality experience" includes or refers to various image processing operations corresponding to an image modification, filter, media overlay, transformation, and the like. In some examples, these image processing operations provide an interactive experience of a real-world environment, where objects, surfaces, backgrounds, lighting etc., in the real world are enhanced by computer-generated perceptual information. An augmented reality experience may also include associated audio, such as a soundtrack or effects sounds. In this context an "AR effect" comprises the collection of data, parameters, and other assets needed to apply a selected augmented reality experience to an image or a video feed. In some examples, augmented reality effects are provided by Snap, Inc. under the registered trademark LENSES.

Messaging or social media applications are increasingly being used to browse and view content created by other users of the application. In some examples, short-form videos captured, generated or modified by users of the application may be presented in a public collection of such videos, which can then be viewed, liked, favorited and forwarded by a user of the messaging or social media application. In one example, such a collection of videos is provided under the trademark SPOTLIGHT in the Snapchat application by Snap, Inc.

Users can post videos to the public collection or can forward them to others for viewing on the messaging application. Any particular video may have been captured with particular camera settings and one or more AR effects. The transmitted videos include, as metadata, the camera settings and an identification of the associated effect(s). By providing a viewer of the video with a shortcut, the user can apply the corresponding camera settings and AR effects to the video feed being generated by a camera in their device. This permits the user to duplicate the effects and settings used in the creation of a viewed video, for use in capturing their own video.

While examples described herein refer to videos posted to a public collection for viewing, it will be appreciated that the methods described herein can be used for images, user stories or any other type of content that is created and posted or shared and that includes specific camera settings or AR effects.

In some examples, provided is a method, executed by one or more processors, for providing augmentation effects on a device including a display and at least one camera, the method including displaying a video on the display of the device, the video including data specifying camera settings and augmentation effects that were applied to the video, displaying a camera effects shortcut, receiving user selection of the camera effects shortcut, and based on receipt of user selection of the camera effects shortcut, displaying, on the display, a video feed from the at least one camera with the augmentation effects and camera settings specified by the data applied to the video feed.

The method may further include displaying, with the video, an effects indicator identifying a name and creator of the augmentation effects. The method may further include receiving selection of the effects indicator, displaying information on the augmentation effects, and displaying a call to action user interface element for the user to apply the augmentation effects to the video feed. Selection of the call to action user interface element may result in application of the augmentation effects to the video feed but not the application of the camera settings.

The method may also include displaying, with the video, a context indicator identifying an audio track playing with the video, receiving user selection of the context indicator, and based on receiving user selection of the context indicator, displaying further information relating to the audio track. A confirmation user interface item may be displayed prior to displaying the video feed from the at least one camera with the augmentation effects and camera settings, and the method may further comprise receiving selection of the confirmation user interface item, and based on receiving selection of the confirmation user interface item, displaying the video feed from the at least one camera with the augmentation effects and camera settings. In some examples, displayed, with the video is a context indicator identifying an audio track playing with the video.

In some examples provided is, a computing device includes at least one camera, a display and one or more processors. The computing device also includes a memory storing instructions that, when executed by the one or more processors, configure the device to perform operations for providing augmentation effects according to any of the method steps described above, the operations including but not limited to displaying a video on the display of the device, the video including data specifying camera settings and augmentation effects that were applied to the video, displaying a camera effects shortcut, receiving user selection of the camera effects shortcut, and based on receipt of user selection of the camera effects shortcut, displaying, on the display, a video feed from the at least one camera with the augmentation effects and camera settings specified by the data applied to the video feed.

In one aspect, a non-transitory computer-readable storage medium, the computer-readable storage medium including instructions that when executed by a computer, cause the computer to perform operations for providing augmentation effects on a device including a display and at least one camera, the operations according to any of the method steps described above, the operations including but not limited to displaying a video feed on the display of the device, the video feed being captured by the at least one camera, displaying a camera effects shortcut, the camera effects shortcut being associated with a collection of augmented reality effects and camera settings, receiving user selection of the camera effects shortcut, and based on receipt of user selection of the camera effects shortcut, displaying, on the display, a modified video feed from the at least one camera in which the augmented reality effects and camera settings associated with the camera effects shortcut have been applied.

Other technical features may be readily apparent to one skilled in the art from the following figures, descriptions, and claims.

FIG. 1 is a block diagram showing an example messaging system 100 for exchanging data (e.g., messages, media and associated content) over a network. The messaging system 100 includes multiple instances of a user device 102, each of which hosts a number of applications, including a messaging client 104 and other applications 106. Each messaging client 104 is communicatively coupled to other instances of the messaging client 104 (e.g., hosted on respective other client devices 102), a messaging server system 108 and third-party servers 110 via a network 112 (e.g., the Internet). A messaging client 104 can also communicate with locally-hosted applications 106 using Application Program Interfaces (APIs).

A messaging client 104 is able to communicate and exchange data with other messaging clients 104 and with the messaging server system 108 via the network 112. The data exchanged between messaging clients 104, and between a messaging client 104 and the messaging server system 108, includes functions (e.g., commands to invoke functions) as well as payload data (e.g., text, audio, video or other multimedia data).

The messaging server system 108 provides server-side functionality via the network 112 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a user device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an Application Program Interface (API) server 116 is coupled to, and provides a programmatic interface to, application servers 114. The application servers 114 are communicatively coupled to a database server 120, which facilitates access to a database 126 that stores data associated with messages processed by the application servers 114. Similarly, a web server 128 is coupled to the application servers 114, and provides web-based interfaces to the application servers 114. To this end, the web server 128 processes incoming network requests over the Hypertext Transfer Protocol (HTTP) and several other related protocols.

The Application Program Interface (API) server 116 receives and transmits message data (e.g., commands and message payloads) between the user device 102 and the application servers 114. Specifically, the Application Program Interface (API) server 116 provides a set of interfaces (e.g., routines and protocols) that can be called or queried by the messaging client 104 in order to invoke functionality of the application servers 114. The Application Program Interface (API) server 116 exposes various functions supported by the application servers 114, including account registration, login functionality, the sending of messages, via the application servers 114, from a particular messaging client 104 to another messaging client 104, the sending of media files (e.g., images or video) from a messaging client 104 to a messaging server 118, and for possible access by another messaging client 104, the settings of a collection of media data (e.g., story), the retrieval of a list of friends of a user of a user device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 114 host a number of server applications and subsystems, including for example a messaging server 118, an image processing server 122, and a social network server 124. The messaging server 118 implements a number of message processing technologies and functions, particularly related to the aggregation and other processing of content (e.g., textual and multimedia content) included in messages received from multiple instances of the messaging client 104. The text and media content from multiple sources may be aggregated into collections of content (e.g., called stories or galleries). These collections are then made available to the messaging client 104. Other processor and memory intensive processing of data may also be performed server-side by the messaging server 118, in view of the hardware requirements for such processing.

The application servers 114 also include an image processing server 122 that is dedicated to performing various image processing operations, typically with respect to images or video within the payload of a message sent from or received at the messaging server 118.

The social network server 124 supports various social networking functions and services and makes these functions and services available to the messaging server 118. To this end, the social network server 124 maintains and accesses an entity graph within the database 126. Examples of functions and services supported by the social network server 124 include the identification of other users of the messaging system 100 with which a particular user has relationships or is "following," and also the identification of other entities and interests of a particular user.

Figure 2:
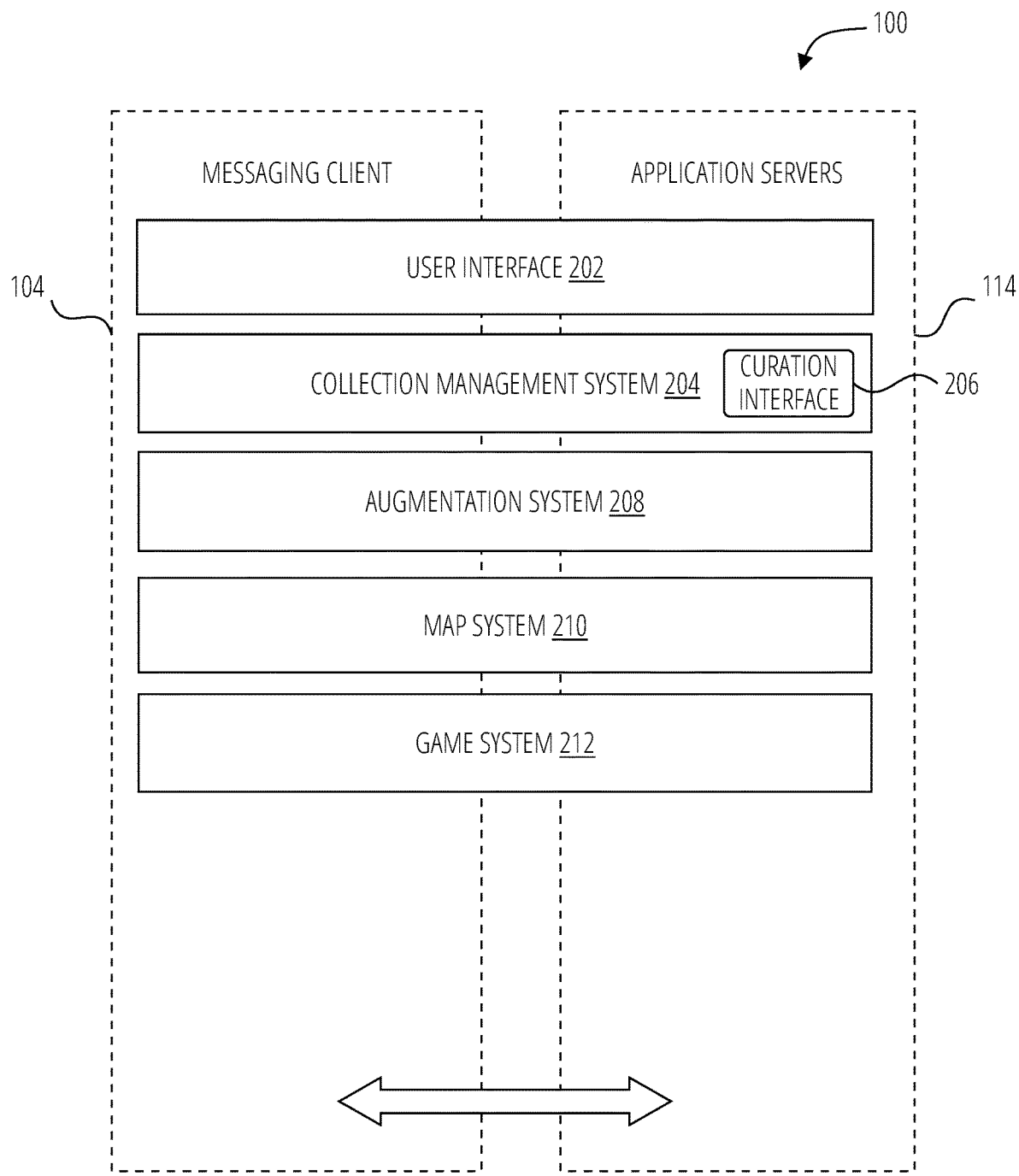
FIG. 2 is a diagrammatic representation of a messaging system, in accordance with some examples, that has both client-side and server-side functionality.

FIG. 2 is a block diagram illustrating further details regarding the messaging system 100, according to some examples. Specifically, the messaging system 100 is shown to comprise the messaging client 104 and the application servers 114. The messaging system 100 embodies a number of subsystems, which are supported on the client side by the messaging client 104 and on the sever-side by the application servers 114. These subsystems include, for example, a user interface 202, a collection management system 204, an augmentation system 208, a map system 210, and a game system 212.

The user interface 202 is responsible for providing output to and receiving input from a user of the messaging client 104 on the user device 102. The user interface provides a user-manipulatable display output on a display (see further user output components 1726 in FIG. 17 and as described below) of the user device 102 as is known in the art. In one example, the user interface comprises a chat interface whereby a user can send and receive messages and associated content from one or more remote users. The user interface 202 also permits a user to manipulate live or captured media, for example by providing augmented reality effects on captured photos or videos, or on a live video feed from a camera of the user device.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 furthermore includes a curation interface 206 that allows a collection manager to manage and curate a particular collection of content. For example, the curation interface 206 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 208 provides various functions that enable a user to augment (e.g., annotate or otherwise modify or edit) media content associated with a message. For example, the augmentation system 208 provides functions related to the generation and publishing of media overlays for messages processed by the messaging system 100. The augmentation system 208 operatively supplies a media overlay or augmentation (e.g., an image filter) to the messaging client 104 based on a geolocation of the user device 102. In another example, the augmentation system 208 operatively supplies a media overlay to the messaging client 104 based on other information, such as social network information of the user of the user device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the user device 102. For example, the media overlay may include text or image that can be overlaid on top of a photograph taken by the user device 102. In another example, the media overlay includes an identification of a location overlay (e.g., Venice beach), a name of a live event, or a name of a merchant overlay (e.g., Beach Coffee House). In another example, the augmentation system 208 uses the geolocation of the user device 102 to identify a media overlay that includes the name of a merchant at the geolocation of the user device 102. The media overlay may include other indicia associated with the merchant. The media overlays may be stored in the database 126 and accessed through the database server 120.

The map system 210 provides various geographic location functions, and supports the presentation of map-based media content and messages by the messaging client 104. For example, the map system 210 enables the display of user icons or avatars on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 212 provides various gaming functions within the context of the messaging client 104. The messaging client 104 provides a game interface providing a list of available games that can be launched by a user within the context of the messaging client 104, and played with other users of the messaging system 100. The messaging system 100 further enables a particular user to invite other users to participate in the play of a specific game, by issuing invitations to such other users from the messaging client 104. The messaging client 104 also supports both the voice and text messaging (e.g., chats) within the context of gameplay, provides a leaderboard for the games, and also supports the provision of in-game rewards (e.g., coins and items).

Figure 3:
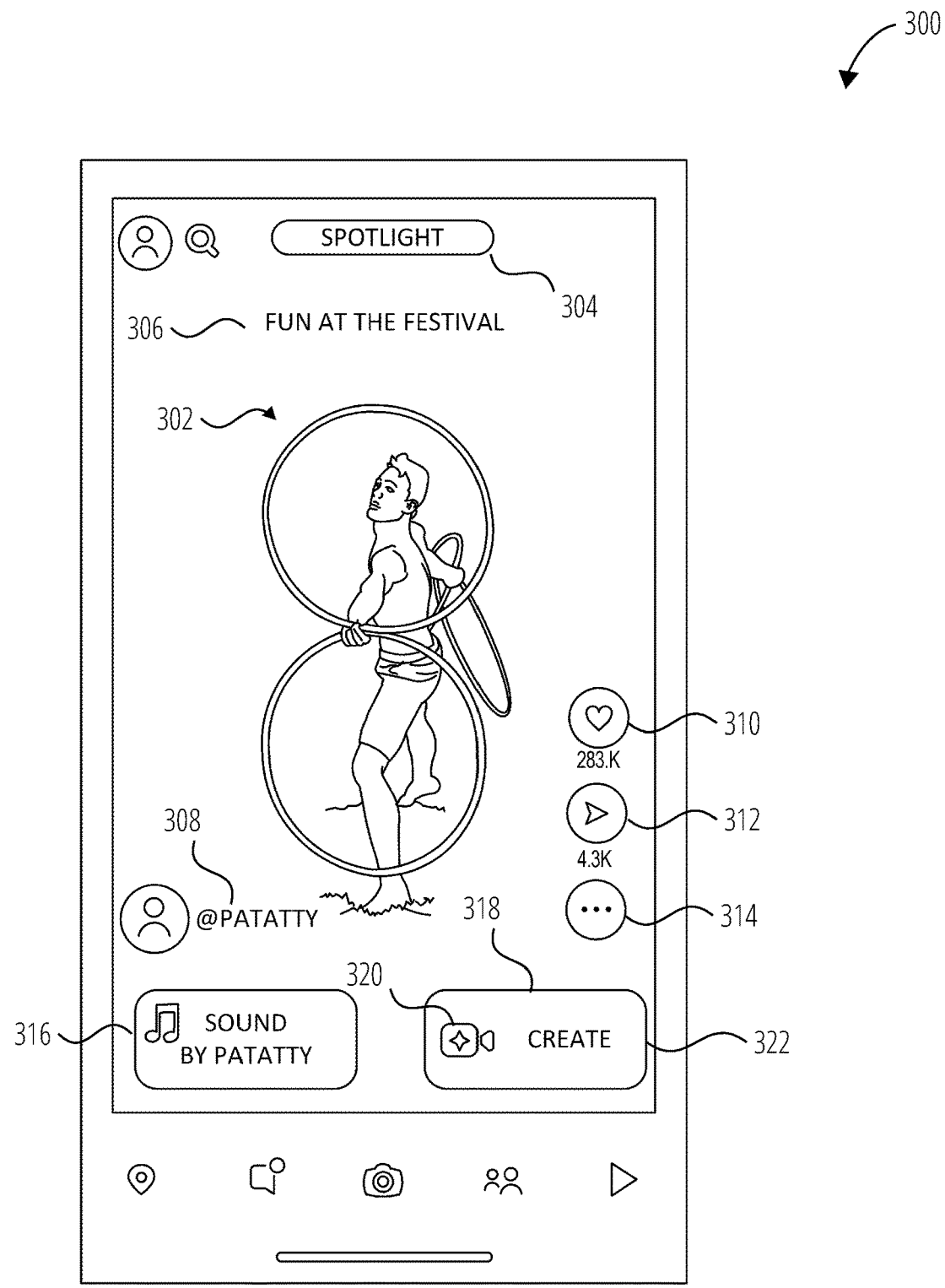
FIG. 3 illustrates a mobile device user interface according to some examples.

FIG. 3 illustrates a mobile device user interface 300 according to some examples. The user interface 300 is presented on a touch screen of a mobile device, such as user device 102. The user interface 300 shows the presentation, in some examples, of a short-form video of a man 302 performing with hula hoops, which is being played back for viewing by a user of the user device 102. The video is part of a collection of publicly-available videos that can be viewed and accessed, as indicated by the SPOTLIGHT banner 304. Also displayed in conjunction with the video is a title 306, the username 308 of the user who posted the video, and user-interface options such as a like or favorite button 310, a forward button 312 and an overflow indicators icon 314 indicating that additional user interface options relating to the video are available.

Figure 7:
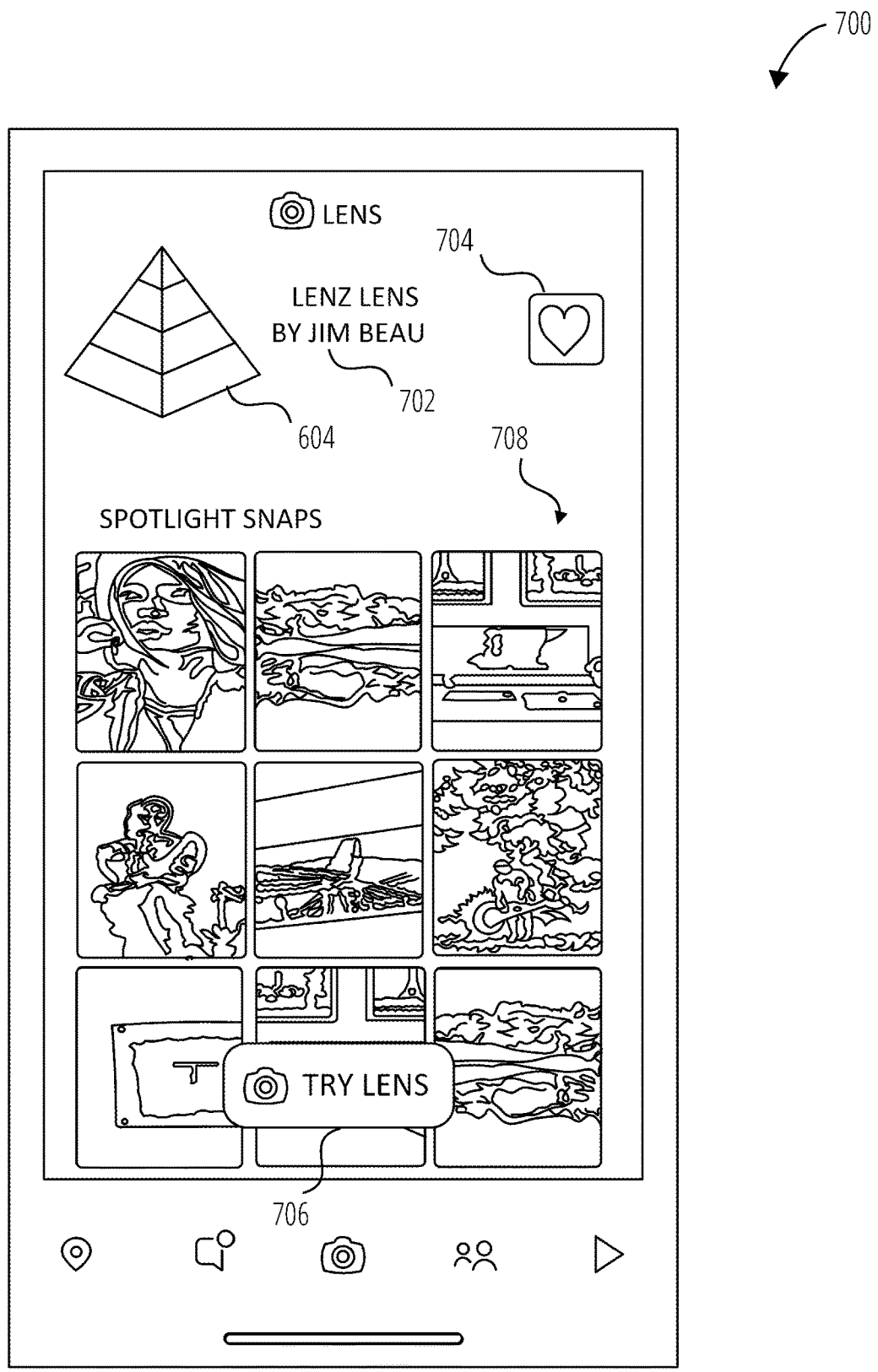
FIG. 7 illustrates a mobile device user interface according to some examples.

The user interface 300 also includes one or more context indicators 316, which provide additional contextual information for the video. In this example, the context indicator 316 relates to the audio track for the video, and states the name of the audio track and the artist or composer. Selection of the context indicator 316 transitions to a display, for example as shown in FIG. 7, in which further information and interface options are provided. In the case of an audio track, selection of the context indicator 316 may display information on the artist and the song, provide an option to play or favorite the song, to capture a video with the song playing in the background, and so forth.

Also shown in FIG. 3 is a call-to-action (CTA) camera effects shortcuts button 318 that includes a camera icon 320 and CTA text 322. The video that is being shown on the user device 102 will have been captured by the original creator using various camera settings and potentially with various visual or audio effects, such as Snap, Inc.'s LENSES augmented reality (AR) effects. When the video is streamed or downloaded from a remote location, such as a database server 120, it will include metadata comprising the camera settings that were used at the time of capture, and the identity, timing and parameters (if any) of any AR effects that were applied at or after the video was captured.

If the user of the user device 102 likes the overall experience provided by these camera settings and AR effects, they can select the camera effects shortcut button 318 to use them in their own video or image capture. Receipt of selection of the camera effects shortcut button 318 by the user device 102 and messaging client 104 transitions the user interface 300 to the user interface 400 of FIG. 4.

Figure 4:
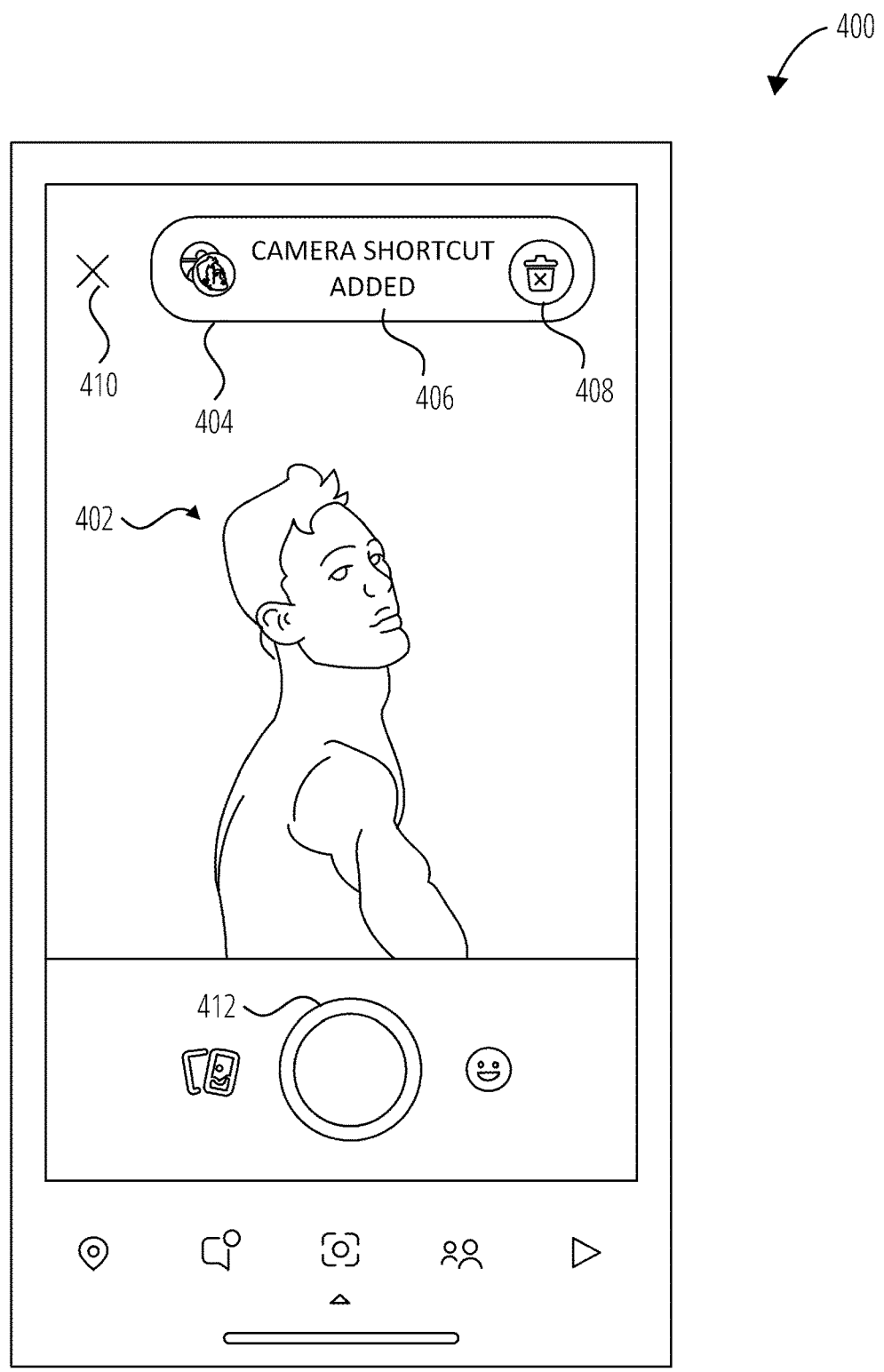
FIG. 4 illustrates a mobile device user interface according to some examples.

FIG. 4 illustrates a mobile device user interface 400 according to some examples. The user interface 400 is displayed after selection of the camera effects shortcut button 318 in FIG. 3. In the user interface 400, the user device 102 has changed from a mode in which the short-form video is being viewed, to one in which the user of the user device 102 can capture their own video or image. Presented on the touchscreen of the user device 102 is a live video feed from one of the cameras on the client device. As shown, an individual 402 is portrayed in the live video feed. This could be the user, as captured by the front camera of the user device 102, or it could be someone in the field of view of a back camera of the user device 102, for example.

The user interface 400 includes a banner 404 with text 406 indicating that a "camera shortcut" corresponding to the camera settings and AR effects of FIG. 3 has been added, and that the associated camera settings and AR effects are being applied to the displayed live video feed from the relevant camera of the user device 102. Also included is a trash icon 408, selection of which will dismiss the banner 404, remove any applied AR effects and return the camera to its previous settings. A dismiss icon 410 will dismiss the banner 404 but will leave the AR effects and camera settings corresponding to the camera shortcut in place.

In cases in which multiple AR effects were applied to the original video, the AR effects that are applied to the video feed are applied (or "stacked") in the same order as the in the underlying content. In some cases, the order in which the AR effects are applied to an image or video may provide a slightly different end result. An additional button or icon may be provided in the user interface 400 that, upon selection, displays a list of the applied AR effects in the order in which they are applied. The list or stack can then be reordered, or individual AR effects can be removed, or additional AR effects can be added.

The user can select a capture icon 412 at any time to capture video or an image with or without the camera settings and AR effects in place, as appropriate.

FIG. 5A and FIG. 5B illustrate mobile device user interfaces according to some examples. The user interface 500a of FIG. 5A and user interface 500b of FIG. 5B, as with the user interface 300 of FIG. 3, include a short-form video that is part of a collection of publicly-available videos that can be viewed and accessed, as indicated by the SPOTLIGHT banner 304. In both cases, a single context indicator 502 is provided, but in FIG. 5A the camera effects shortcut button 318 is expanded and includes both a camera icon 320 and CTA text 322, while in FIG. 5B the camera effects shortcut button 318 has been collapsed and includes only a camera icon 320.

Figure 6A:
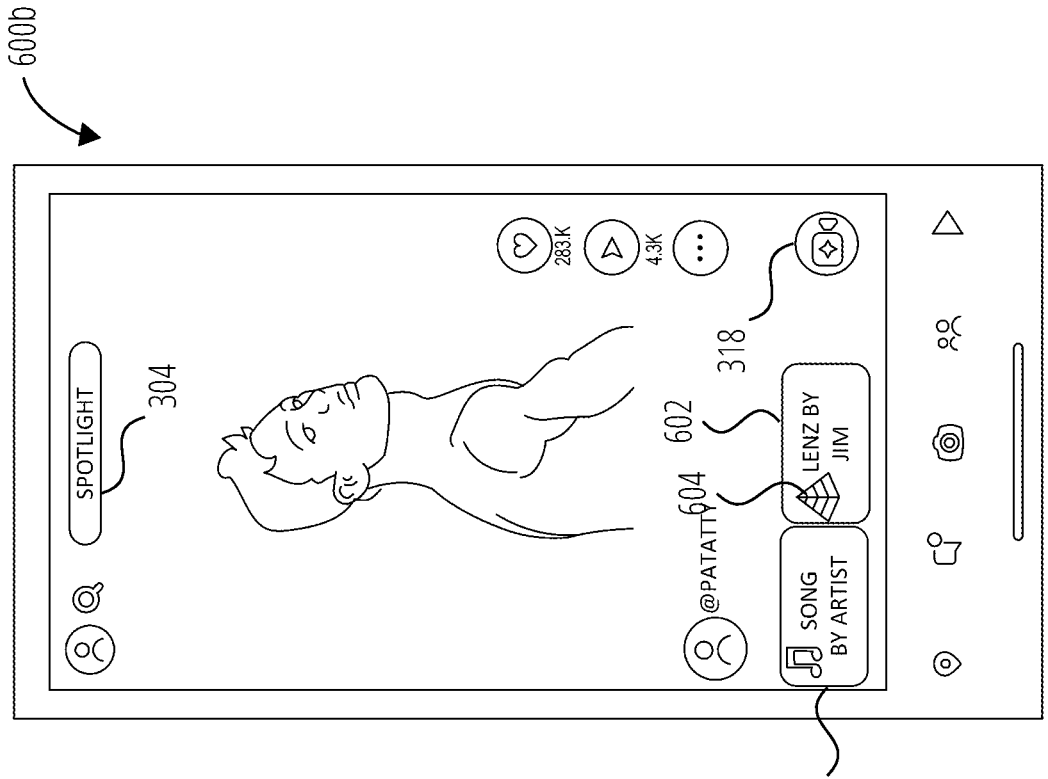
FIG. 6A and FIG. 6B illustrate mobile device user interfaces according to some examples.
Figure 6B:
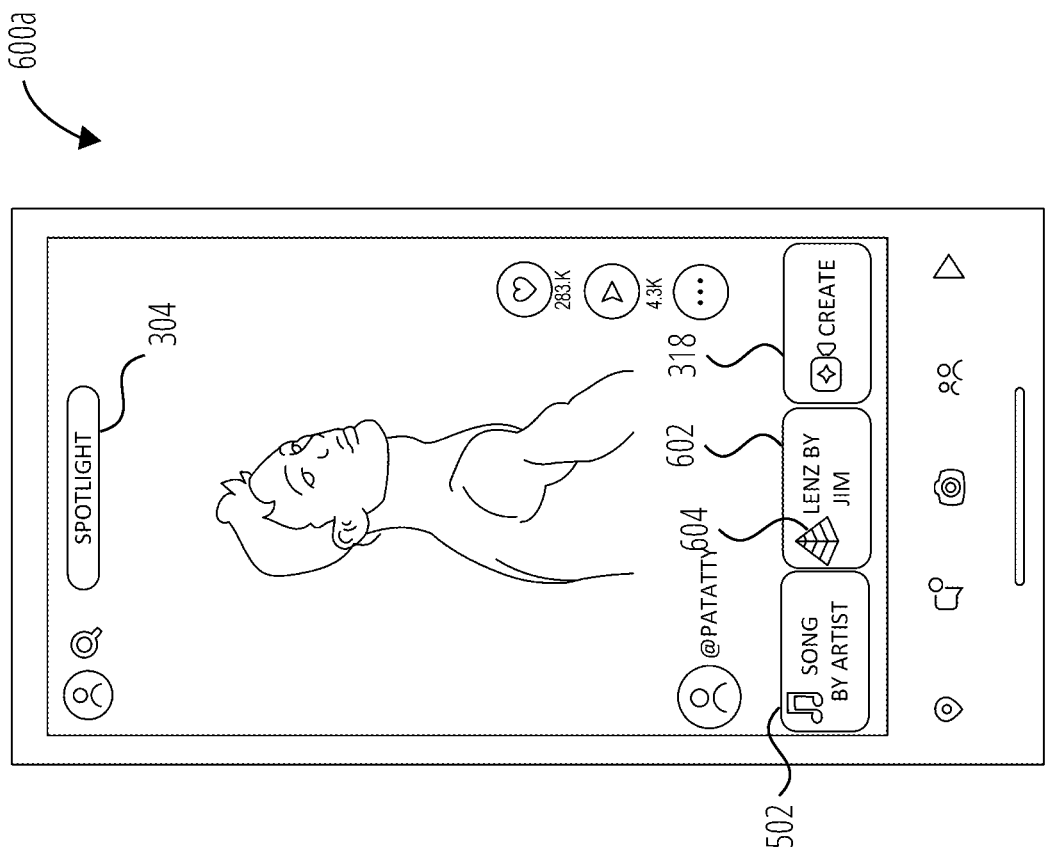

FIG. 6A and FIG. 6B illustrate mobile device user interfaces according to some examples. The user interface 600a of FIG. 6A and user interface 600b of FIG. 6B, as with the user interface 300 of FIG. 3, include a short-form video that is part of a collection of publicly-available videos that can be viewed and accessed, as indicated by the SPOTLIGHT banner 304.

FIG. 6A and FIG. 6B illustrate the use of multiple context indicators, including a first context indicator 502 that relates to the audio track for the video, and that states the name of the audio track and the artist or composer, and a second context indicator comprising an effects indicator 602 that relates to the AR effect(s) that was (were) applied to the video when it was captured. In particular, effects indicator 602 includes the name of the AR effect ("Lens") and the name of its creator ("Jim") as well as an AR effect icon 604 that may be characteristic of either the particular AR effect or the creator of the AR effect(s). In this regard, the creator of the AR effect may not in fact have been the original author of a particular effect or effects, but may have selected the particular AR effect or combination of AR effects from a library of AR effects, for use with the video. As used herein the term creator is understood to mean both the original author of the effect and someone who has selected one or more AR effects for use with the displayed video.

As before, in FIG. 6A the camera effects shortcut button 318 is expanded and includes both a camera icon and CTA text, while in FIG. 6B the camera effects shortcut button 318 has been collapsed and includes only a camera icon.

Selection by the user of the effects indicator 602 will transition the user interface to the user interface 700 of FIG. 7.

FIG. 7 illustrates a mobile device user interface 700 according to some examples. The user interface 700 is displayed after receipt by the user device 102 and messaging client 104 of user input selecting the effects indicator 602 in FIG. 6A or FIG. 6B.

The user interface 700 provides more information and options relating to the AR effect identified by the effects indicator 602. The user interface 700 includes the AR effect icon 604, text 702 identifying the name of the AR effect and the name of the creator of the AR effect, and a favorite icon 704 that can be selected by the user of the user device 102 to include the AR effect in their collection of favorite AR effects. Also provided is a CTA button 706, inviting the user to try the particular AR effect. Selection of the CTA button 706 (with any confirming steps as below) will apply the corresponding AR effects to a video feed from one of the cameras in the user device 102, but without the camera settings associated with the camera shortcut button 318 that was included with the video. Selection by the user of the CTA button 706 will transition to the user interface 800 of FIG. 8.

Also shown in FIG. 7 is a grid 708 of thumbnails of publicly available videos that can be selected for viewing of the video identified by the corresponding thumbnail. The publicly available videos may be related in some way to the creator of the AR effect(s), or may be based on popularity or sponsorship of the publicly available videos, based on preferences or viewing history of the user of the user device 102, and so forth.

Figure 8:
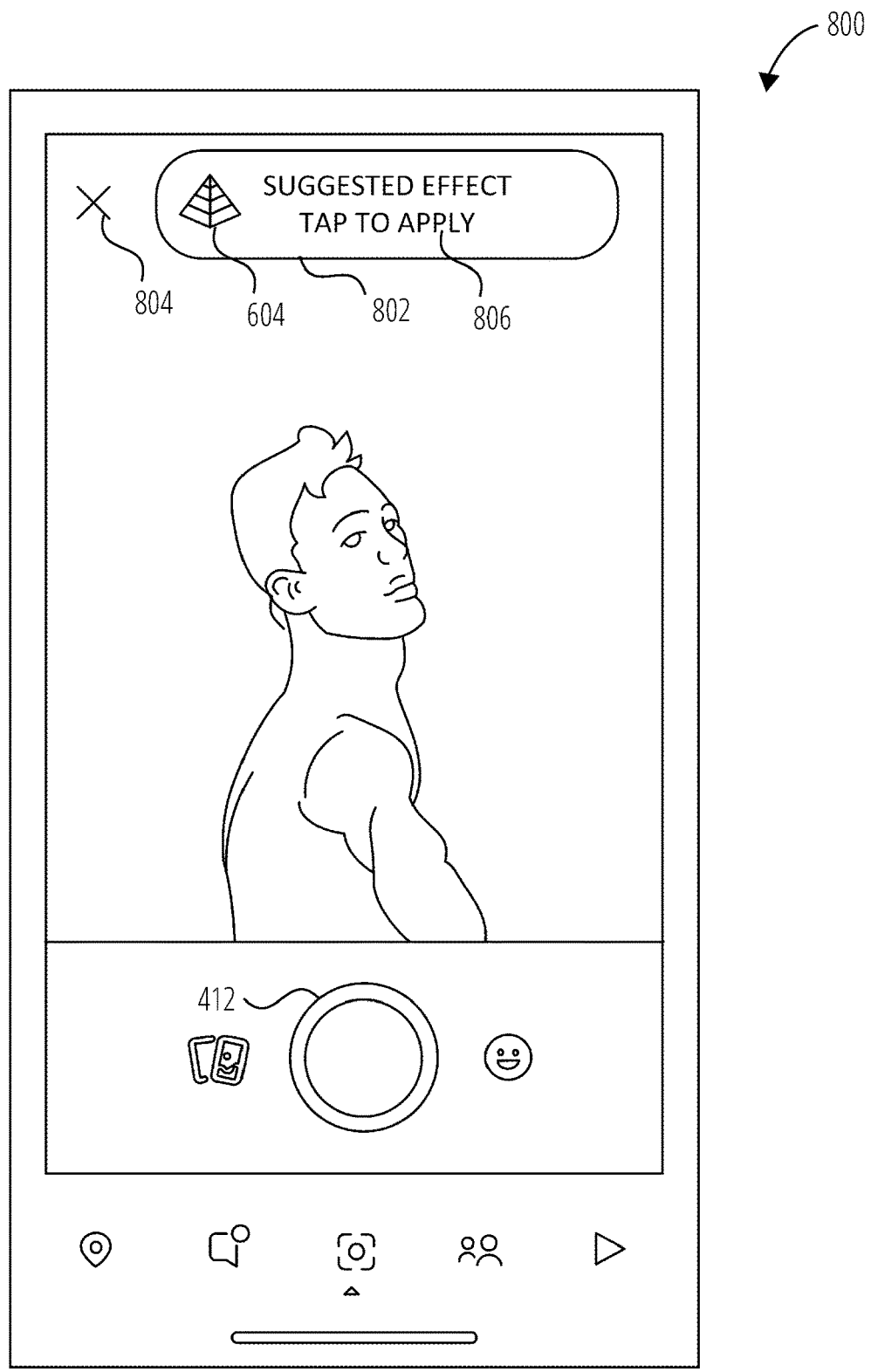
FIG. 8 illustrates a mobile device user interface according to some examples.

FIG. 8 illustrates a mobile device user interface 800 according to some examples. The user interface 800 is displayed upon receipt of selection of the CTA button 706 in FIG. 7 by the user. In response, the user device 102 transitions into a mode in which a video feed from one of the cameras of the user device 102 is displayed on the touchscreen of the user device 102. A banner 802 with the AR effect icon 604 and a text prompt 806 invites the user to apply the AR effect corresponding to the effects indicator 602. If the user selects the banner 802, the corresponding effect is applied to the video feed. The user can then choose to capture a video or image with the AR effect in place by pressing the capture icon 412. Also provided is a dismiss icon 804, which will dismiss the banner 802 without applying the AR effect corresponding to the banner 802.

Alternatively, the effects corresponding to the effects indicator 602 can be applied to the video feed immediately upon selection of the CTA button 706, in which case the banner 802 will include text to the effect that the effects have been applied, and an option to remove them.

Figure 9:
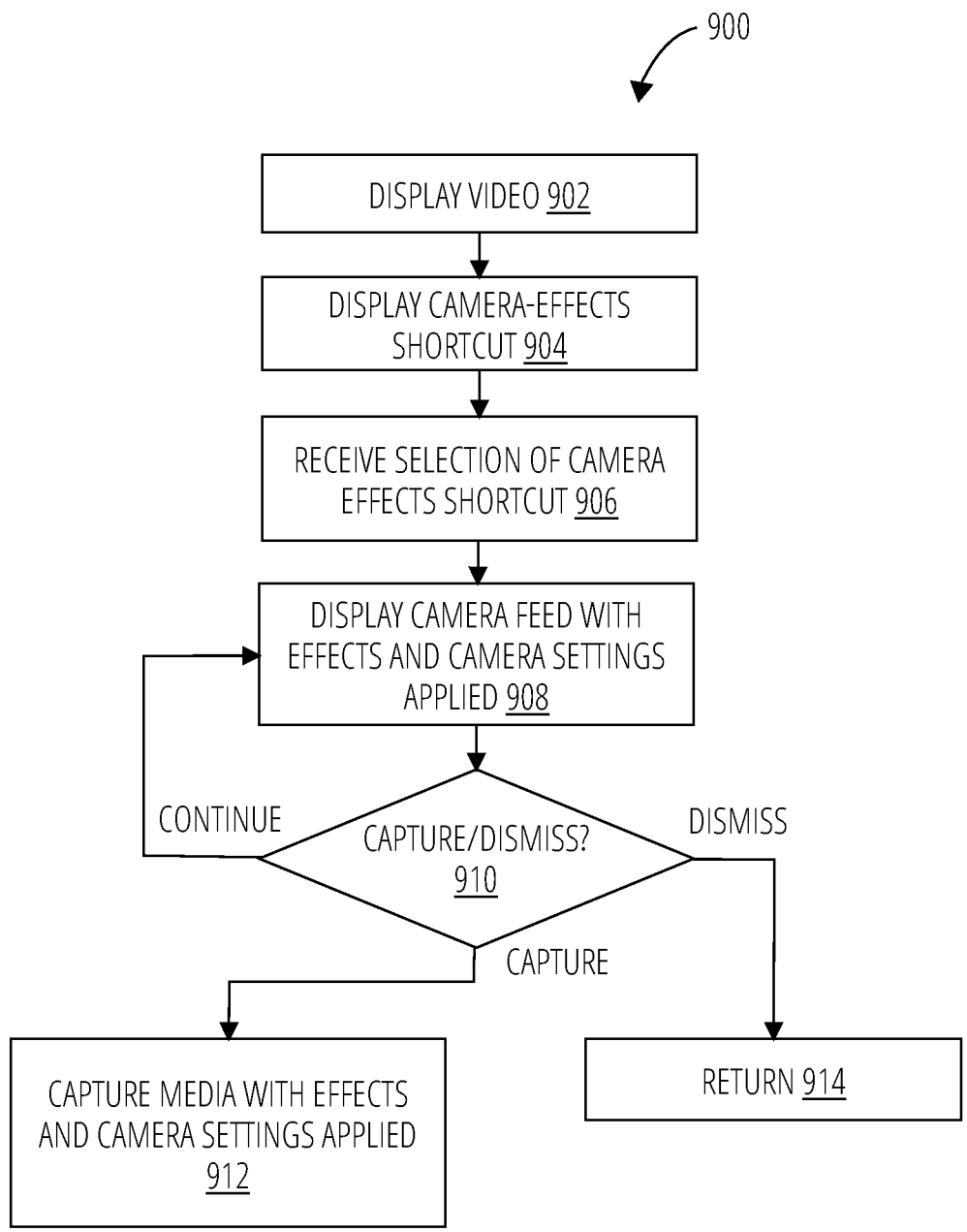
FIG. 9 is a flowchart showing camera and effects shortcut operations according to some examples.

FIG. 9 illustrates a flowchart 900 showing camera and effects shortcut operations according to some examples. The operations illustrated in FIG. 9 will typically execute on user device 102 in an application such as messaging client 104. Various implementations are of course possible, with some of the operations taking place in application servers 114, or with one application calling another application or calling an SDK for required functionality.

The flowchart 900 commences with the display of a video in operation 902. This could be a short-form video provided as part of a collection of short-form videos, but could be any previously-captured video. Accompanying the video is metadata specifying the camera settings and any AR or other visual or audio effects applied during capture or creation of the video.

A camera effects shortcut button or banner corresponding to the camera settings and any AR or other visual or audio effects applied during capture or creation of the video is concurrently displayed in operation 904. Upon receipt of user selection of the camera effects shortcut button in operation 906, a camera feed is displayed on the client device with the AR or other visual or audio effects and camera setting from the video applied thereto, in operation 908.

In operation 910, if user capture input is received, a video or image is captured by the user device 102 and messaging client 104 with the camera effects and AR effects being applied, in operation 912. If a dismiss user input is received, the messaging client 104 returns in operation 914 to another user interface screen, which may for example be to a display of the original video in operation 902, or to a video or image capture screen that displays a video feed from without the camera settings and AR effects applied.

Figure 10:
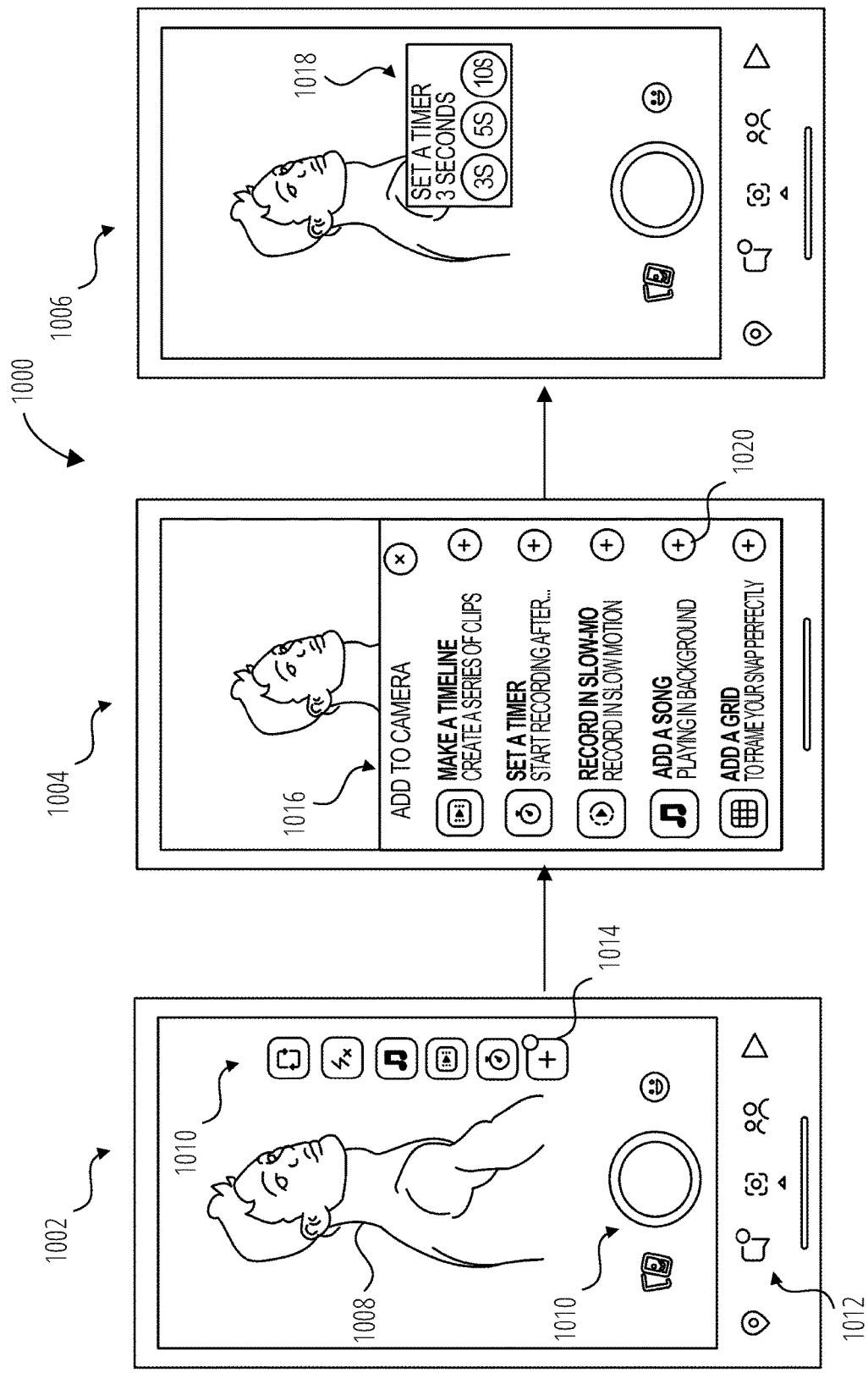
FIG. 10 illustrates a sequence of screens representing a mobile device user interface according to some examples.

FIG. 10 illustrates a sequence of screens representing a mobile device user interface 1000 according to some examples. The screens of the user interface 1000 are presented on a touch screen of a mobile device, such as user device 102. The user interface 1000 shows the presentation, in some examples, of a first camera user interface 1002, a camera options interface 1004, and a second camera user interface 1006.

The camera user interface 1002 shows a video feed on the display of the user device 102 of a person 1008 as captured by one of the cameras of the user device 102. Also included are a number of user interface elements 1010, which, upon receipt of user input, provide various functions such as capturing a video or still image, swapping the front and rear camera, selecting an AR effect, and so forth. Also shown are application user interface elements 1012, which may relate to other UI functions not directly related to the camera.

Included in the user interface elements 1010 is a camera options icon 1014. Upon user selection of the camera options icon 1014, the camera user interface 1002 transitions to camera options interface 1004, in which a menu 1016 of items are provided for user selection relating to camera functions and modes, which can be added to the user interface elements 1010 in camera user interface 1002 by selecting an "add" user interface element 1020 next to the desired item in the menu 1016. In some examples, these may include setting a timer, recording in slow motion, adding a background song, adding a grid for alignment, or creating a sequence of recordings (or "timeline").

Figure 11:
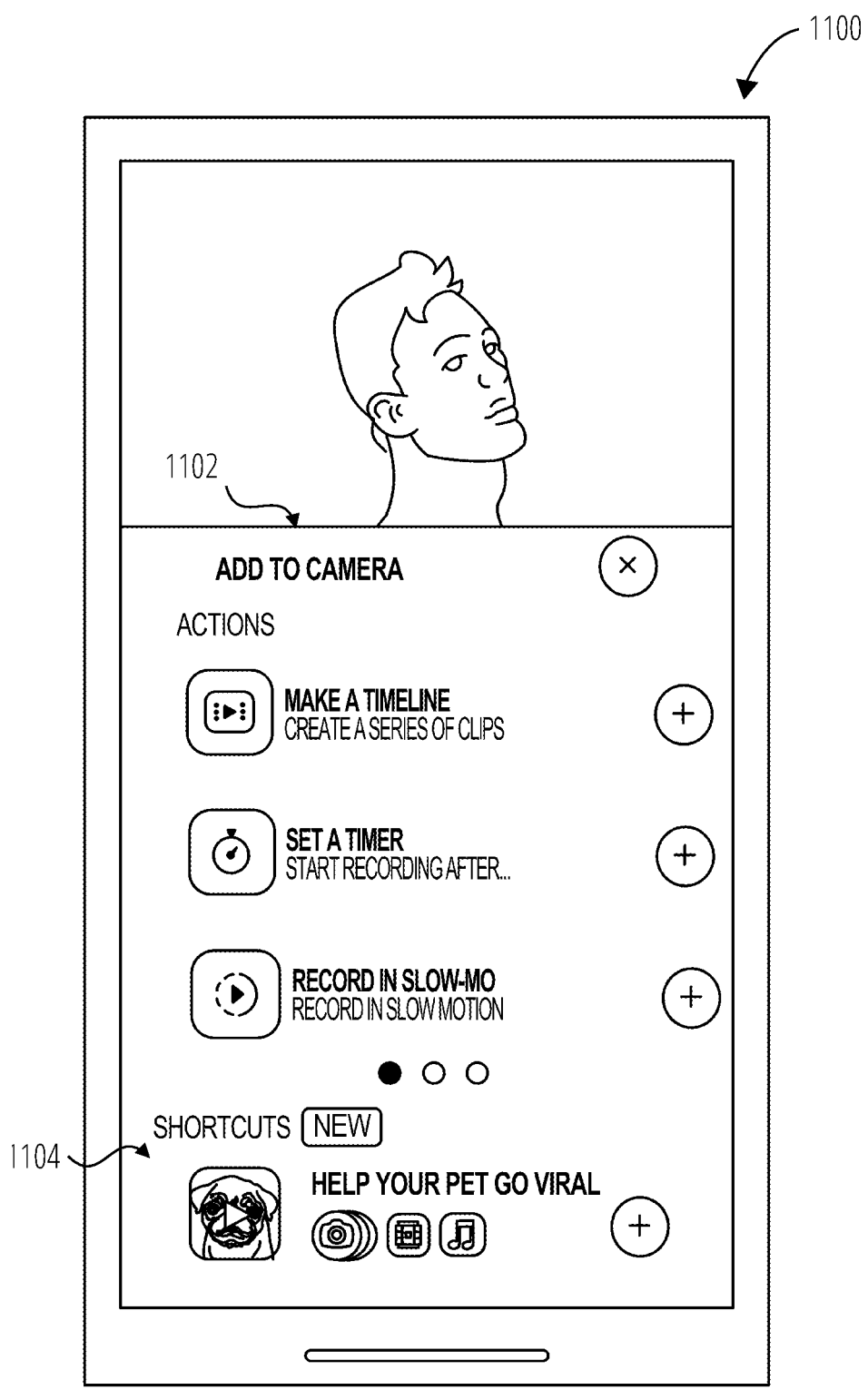
FIG. 11 illustrates a mobile device user interface according to some examples.

Selection of an item from the menu 1016 in camera options interface 1004, or from the user interface elements 1010 in camera user interface 1002, transitions to a camera user interface 1006 in which the option is applied or further options are presented. Illustrated in camera user interface 1006 is a pop-up 1018, which provides further options after the "set a timer" option has been selected in camera user interface 1002 or camera options interface 1004. FIG. 11 illustrates a mobile device user interface 1100 according to some examples.

The user interface 1100 is presented on a touch screen of a mobile device, such as user device 102. The user interface 1100 is displayed, in some examples, after receipt of user input selecting the camera options icon 1014 in camera user interface 1002 of FIG. 10.

As can be seen, the user interface 1100 also includes a menu 1102 of or user selection relating to camera functions and modes, which can be added to the camera user interface 1002. In this case however, the menu includes a display of one or more selectable camera shortcuts 1104 corresponding to a collection of camera settings and AR effects that can be applied to the video feed displayed in the user interface 1100 as discussed above. Selection of camera shortcut 1104 will transition to a user interface screen in which the camera shortcut has been applied, such as shown in FIG. 12.

In some examples, the camera shortcuts 1104 are selected by the messaging application for display in user interface 1100 based on scanning of the video feed as described below with reference to FIG. 13 and FIG. 14.

Figure 12:
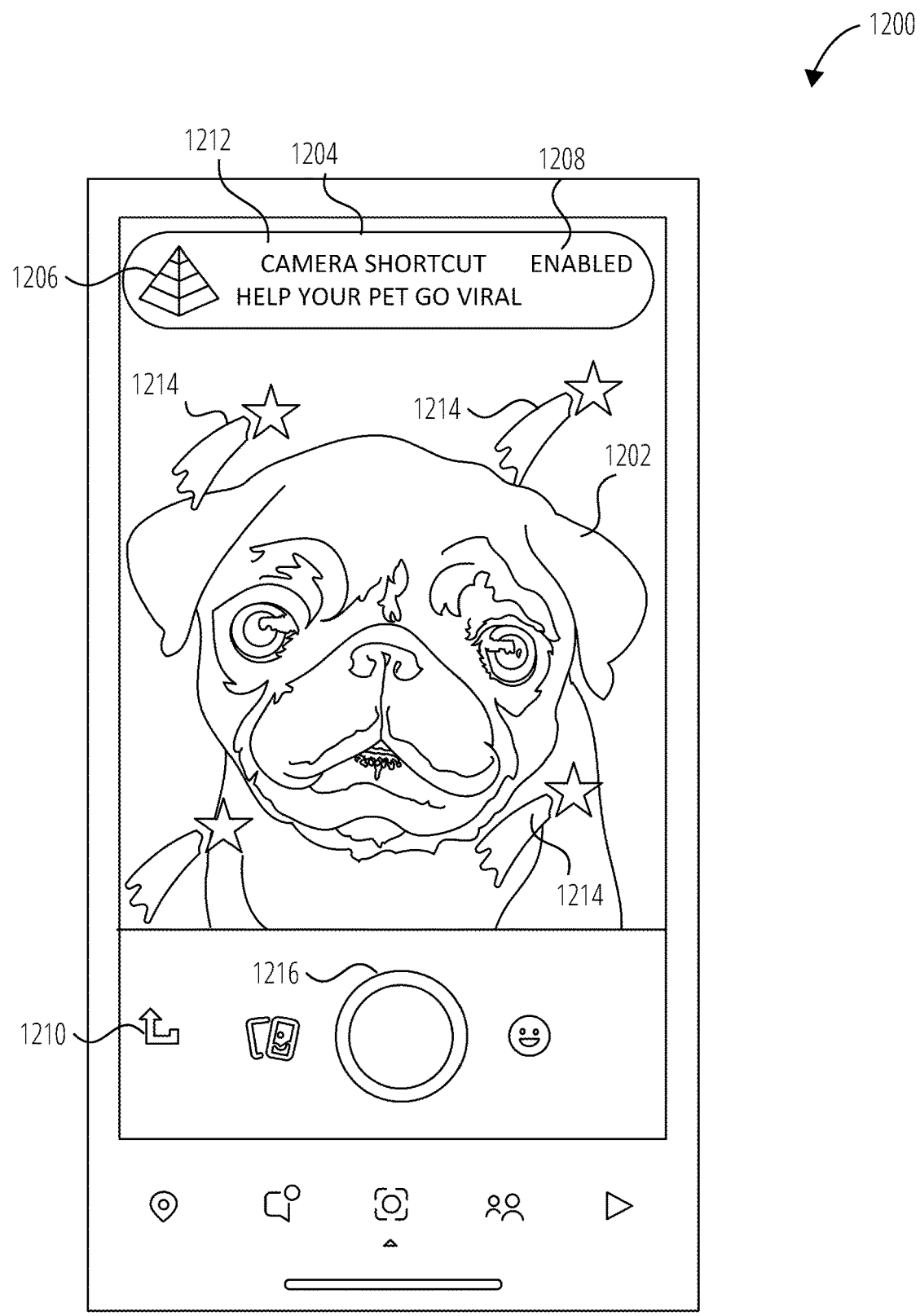
FIG. 12 illustrates a mobile device user interface according to some examples.

FIG. 12 illustrates a mobile device user interface 1200 according to some examples. The user interface 1200 is presented on a touch screen of a mobile device, such as user device 102. The user interface 1200 shows the presentation, in some examples, of a user interface 1200 that is shown after selection of the "Help Your Pet Go Viral" camera shortcut 1104 in FIG. 11.

Shown in FIG. 12 is a video feed of a dog 1202 as captured by one of the cameras on the user device 102. The video feed has been enhanced by the application of AR effects (visual and audio) as well as any associated camera settings, such as shooting star visual AR effects 1214, which are associated with the "Help Your Pet Go Viral" camera shortcut 1104. Also included in user interface 1200 are a banner 1204 including an AR effect icon 1206 corresponding to the camera shortcut 1104, text 1212 indicating that a camera shortcut has been applied and its title, as well as status text 1208 confirming that the camera shortcut is enabled. The user of the client device can then initiate capture of an image or video in which the camera shortcut 1104 has been applied, by selecting capture icon 1216. In some examples a short press will capture an image while a long press will capture a video. Also provided is a return icon 1210, user selection of which will return to a previous user interface, such as camera user interface 1002 or user interface 1100.

Figure 13:
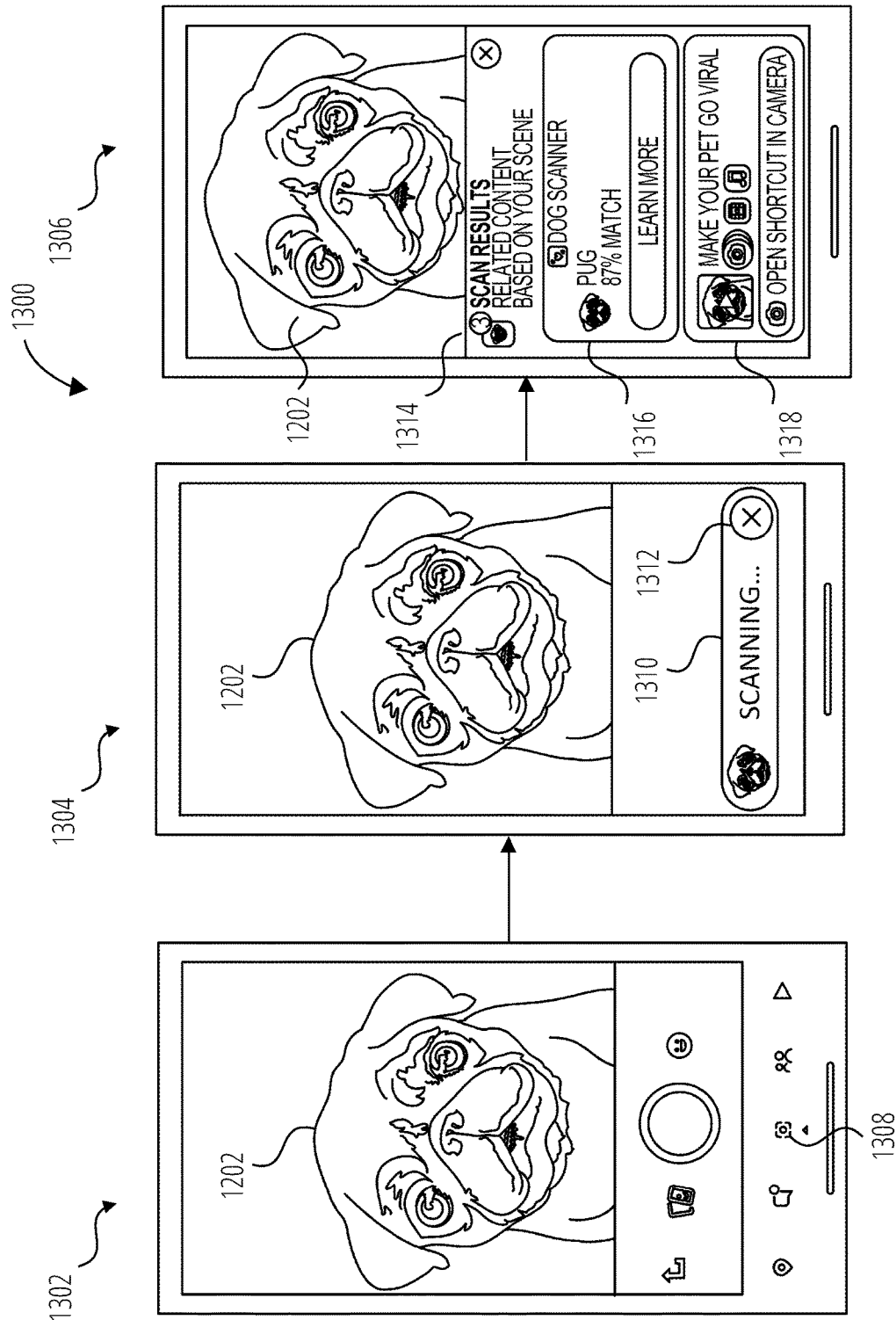
FIG. 13 illustrates a sequence of screens representing a mobile device user interface according to some examples.

FIG. 13 illustrates a sequence of screens representing a mobile device user interface 1300 according to some examples. The user interface 1300 is presented on a touch screen of a mobile device, such as user device 102. The user interface 1300 shows the presentation, in some examples, of a first camera user interface 1302, a scanning user interface 1304, and a scanning results user interface 1306.

The camera user interface 1302 includes various user interface elements, including a scan icon 1308, selection of which will initiate a scanning function performed by the messaging client 104 and the user device 102, in conjunction with the messaging server system 108. The scanning function uses known image and object detection techniques to identify subjects or objects in the video feed. Identification of an object or subject in the video feed can then be used to provide information or options that are related to the identified subject or object. User selection of the scan icon 1308 transitions the camera user interface 1302 to the scanning user interface 1304, in which the scanning process is indicated by a banner 1310. The banner 1310 includes a thumbnail of the dog 1202 in the video feed, on whose image scanning is being performed, text indicating that the scanning is in progress, as well as a dismiss icon 1312 that can be used to return to camera user interface 1302.

Scanning results user interface 1306 is presented when scanning is complete. Scan results 1314 are presented, including related information 1316. In this case, the scanning has identified the subject as a dog, with an 87% match for a pug. The results of the scan, and related information such as types and genres and species associated with the results, are used by the application 106 to search for relevant camera shortcuts. In this case, relevant search terms may be "dog" and "pet" and pug," which are used to identify and retrieve one or more camera effects shortcuts 1318 that the user may want to apply. In this example, a search based on the scan results has identified and included the shortcut for the "Make Your Pet Go Viral" camera shortcut, which upon user selection will transition from the results user interface 1306 to the user interface 1200 of FIG. 12.

The messaging system 100 has automatically selected the "Make Your Pet Go Viral" camera shortcut for inclusion in the scan results 1314 based on matching the results of the scanning with the title of or metadata associated with a category or specific identifier or other identifying or contextual information that is associated with the camera shortcut. In this case the results of the scanning identified the subject in the video feed as a dog, which is a pet, which has matched with the title of or metadata associated with the camera effects shortcut, and accordingly the "Make Your Pet Go Viral" camera effects shortcut 1318 has been included in the scan results 1314.

Figure 14:
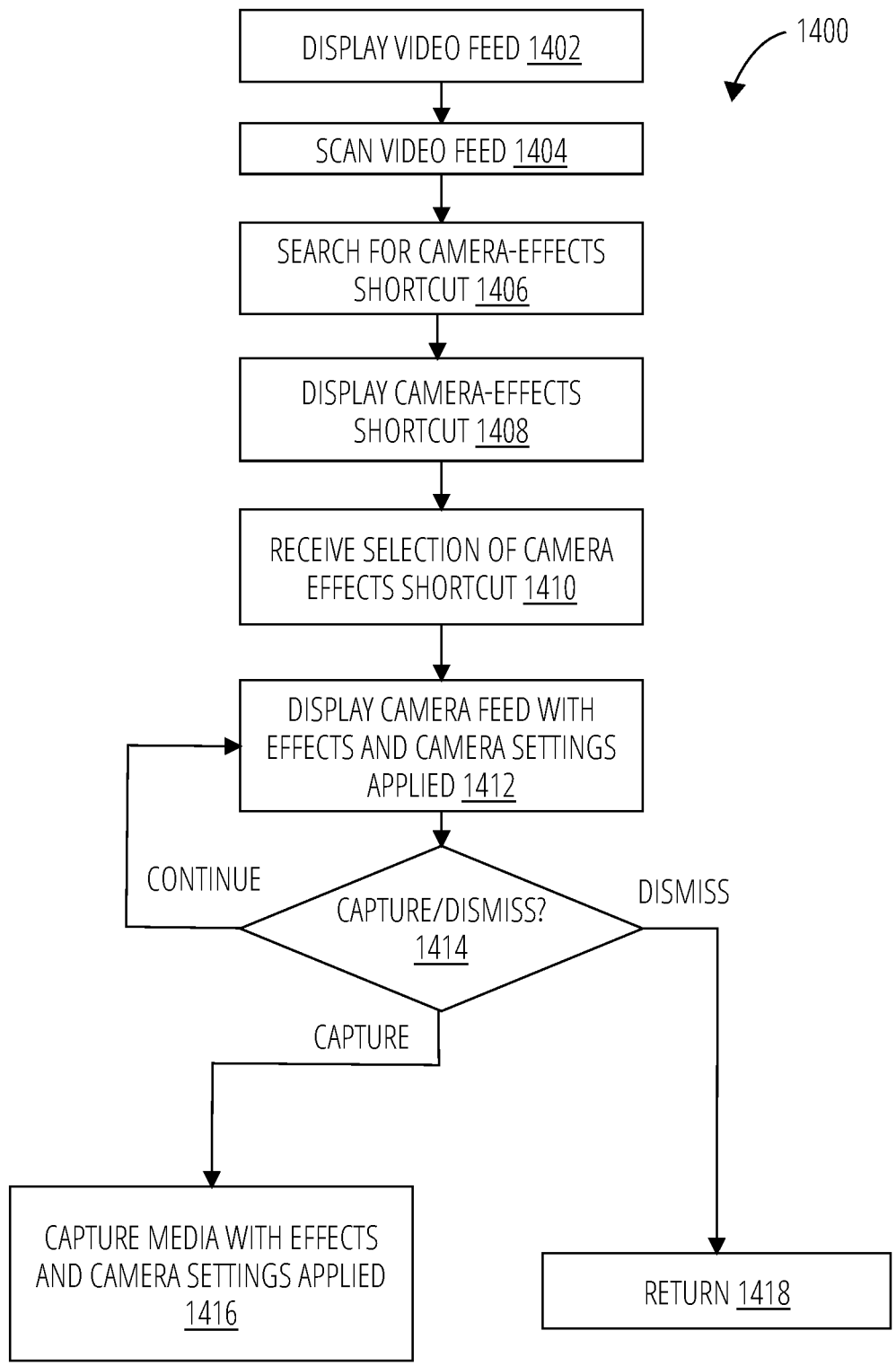
FIG. 14 is a flowchart showing camera and effects shortcut operations according to some examples.

FIG. 14 illustrates a flowchart 1400 showing camera and effects shortcut operations according to some examples. The operations illustrated in FIG. 14 will typically execute on user device 102 in an application such as messaging client 104. Various implementations are of course possible, with some of the operations taking place in application servers 114, or with one application calling another application or calling an SDK for required functionality.

The flowchart 1400 commences with the display on the client user device 102 of a video feed from one of the cameras in the user device 102 in operation 1402. Scanning of the video feed is then performed by the messaging client 104 in operation 1404. This could be done automatically based on a user selecting camera functionality on the user device 102 or in the messaging client 104, or in response to receipt of selection by the user of a scanning function in the messaging client 104 while camera functionality is already enabled. The results of the scan of the video feed are then used to search for camera effects shortcuts that are relevant to the subjects or objects as discussed above.

One or more camera effects shortcut buttons, banners or other user interface elements, corresponding to the camera settings and any AR or other visual or audio effects specified in the camera effects shortcut returned in the search performed in operation 1406 are then displayed in operation 1408. Upon receipt of user selection of a camera effects shortcut button in operation 1410, the displayed camera feed is then modified with the AR or other visual or audio effects and camera settings specified in or associated with the selected camera effects shortcut, in operation 1412.

In operation 1414, if user capture input is received, video or image is captured by the user device 102 and messaging client 104 with the camera effects and AR effects being applied thereto, in operation 1416. If a dismiss user input is received, the messaging client 104 returns in operation 1418 to another user interface screen, which may for example be to a camera user interface 1302 that displays a video feed from without the camera settings and AR effects applied, or to a scan results user interface 1306 that displays the results of the scan.

Figure 15:
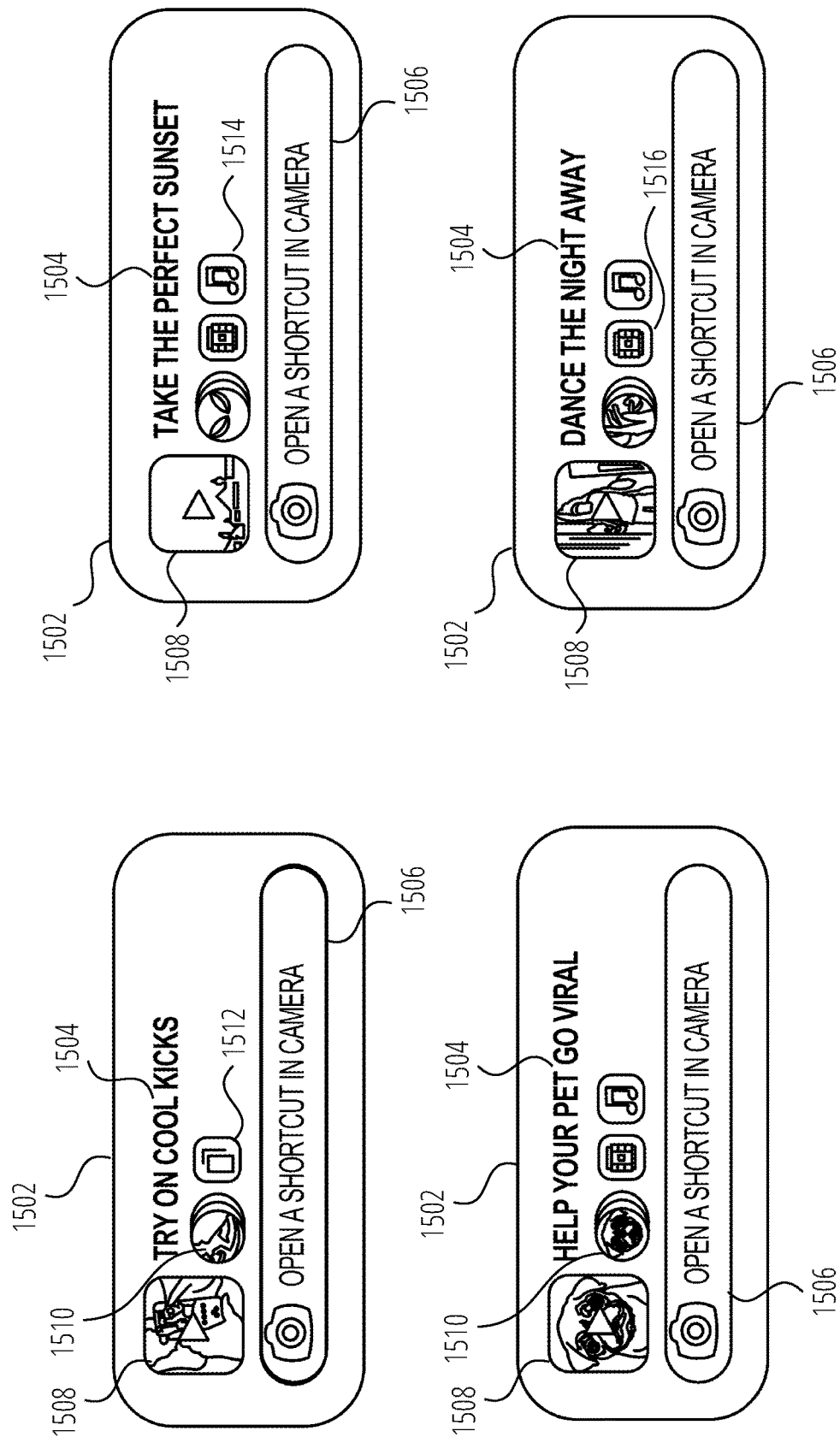
FIG. 15 illustrates a mobile device user interface according to some examples.

FIG. 15 illustrates a number of camera shortcut camera effects shortcut user interface elements 1502 corresponding to different camera shortcuts. As can be seen, the user interface elements 1502 each include a title 1504, a CTA button 1506 inviting user input to enable the camera shortcut, a camera shortcut icon 1508 corresponding to the particular camera shortcut, and a LENS icon 1510 corresponding to a particular collection of AR effects used with the particular camera shortcut. Also included is additional information, such as an image icon 1512 to indicate that the camera shortcut is intended for batch image capture, a music icon 1514 indicating that the camera shortcut includes audio, and a video icon 1516 indicating that the camera shortcut is intended for video or video timeline capture.

Figure 16:
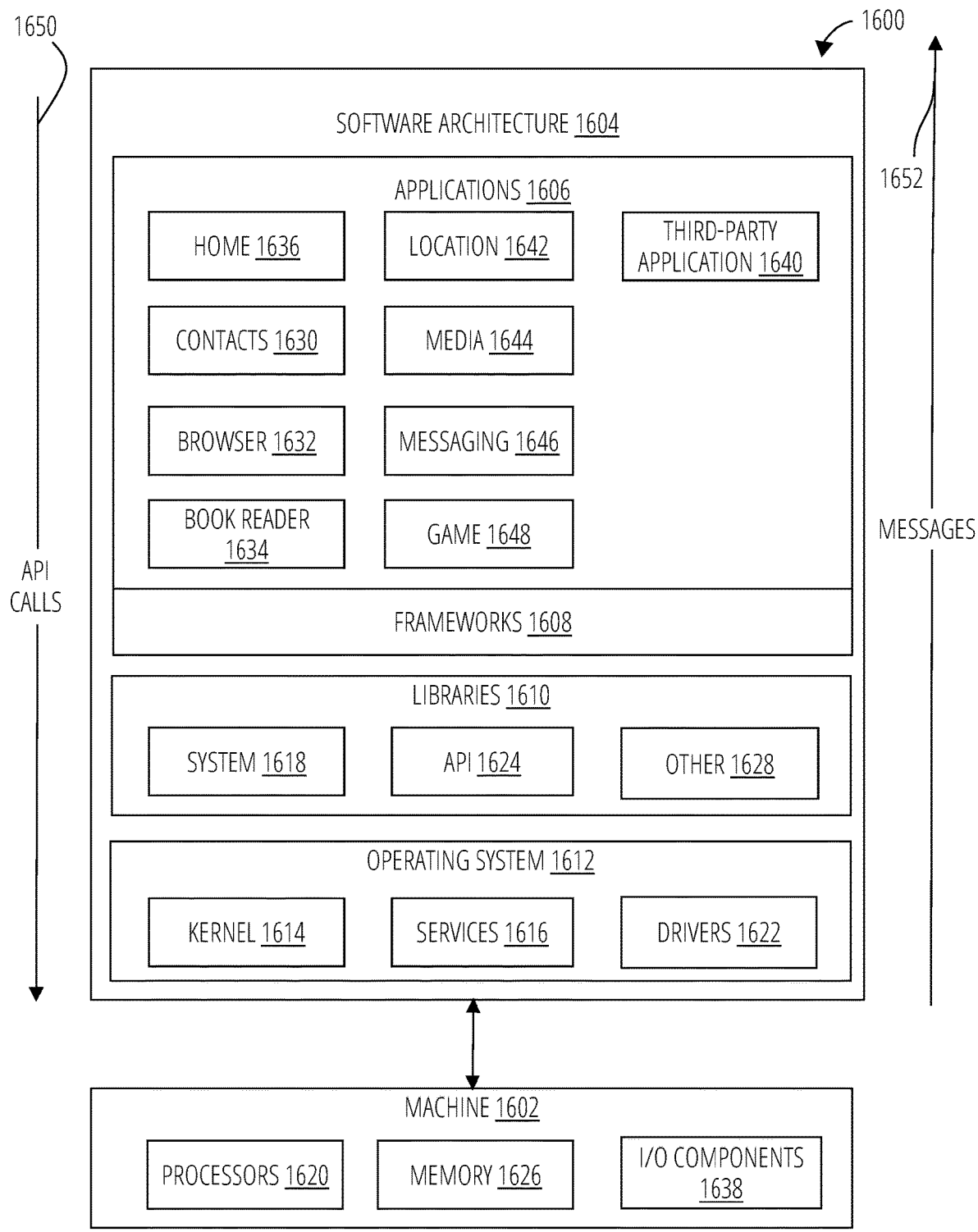
FIG. 16 is a block diagram showing a software architecture within which examples may be implemented.

FIG. 16 is a block diagram 1600 illustrating a software architecture 1604, which can be installed on any one or more of the devices described herein. The software architecture 1604 is supported by hardware such as a machine 1602 that includes processors 1620, memory 1626, and I/O components 1638. In this example, the software architecture 1604 can be conceptualized as a stack of layers, where each layer provides a particular functionality. The software architecture 1604 includes layers such as an operating system 1612, libraries 1610, frameworks 1608, and applications 1606. Operationally, the applications 1606 invoke API calls 1650 through the software stack and receive messages 1652 in response to the API calls 1650.

The operating system 1612 manages hardware resources and provides common services. The operating system 1612 includes, for example, a kernel 1614, services 1616, and drivers 1622. The kernel 1614 acts as an abstraction layer between the hardware and the other software layers. For example, the kernel 1614 provides memory management, processor management (e.g., scheduling), component management, networking, and security settings, among other functionality. The services 1616 can provide other common services for the other software layers. The drivers 1622 are responsible for controlling or interfacing with the underlying hardware. For instance, the drivers 1622 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1610 provide a common low-level infrastructure used by the applications 1606. The libraries 1610 can include system libraries 1618 (e.g., C standard library) that provide functions such as memory allocation functions, string manipulation functions, mathematic functions, and the like. In addition, the libraries 1610 can include API libraries 1624 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1610 can also include a wide variety of other libraries 1628 to provide many other APIs to the applications 1606.

The frameworks 1608 provide a common high-level infrastructure that is used by the applications 1606. For example, the frameworks 1608 provide various graphical user interface (GUI) functions, high-level resource management, and high-level location services. The frameworks 1608 can provide a broad spectrum of other APIs that can be used by the applications 1606, some of which may be specific to a particular operating system or platform.

In an example, the applications 1606 may include a home application 1636, a contacts application 1630, a browser application 1632, a book reader application 1634, a location application 1642, a media application 1644, a messaging application 1646 (e.g. messaging client 104), a game application 1648, and a broad assortment of other applications such as a third-party application 1640. The applications 1606 are programs that execute functions defined in the programs. Various programming languages can be employed to create one or more of the applications 1606, structured in a variety of manners, such as object-oriented programming languages (e.g., Objective-C, Java, or C++) or procedural programming languages (e.g., C or assembly language). In a specific example, the third-party application 1640 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1640 can invoke the API calls 1650 provided by the operating system 1612 to facilitate functionality described herein.

Figure 17:
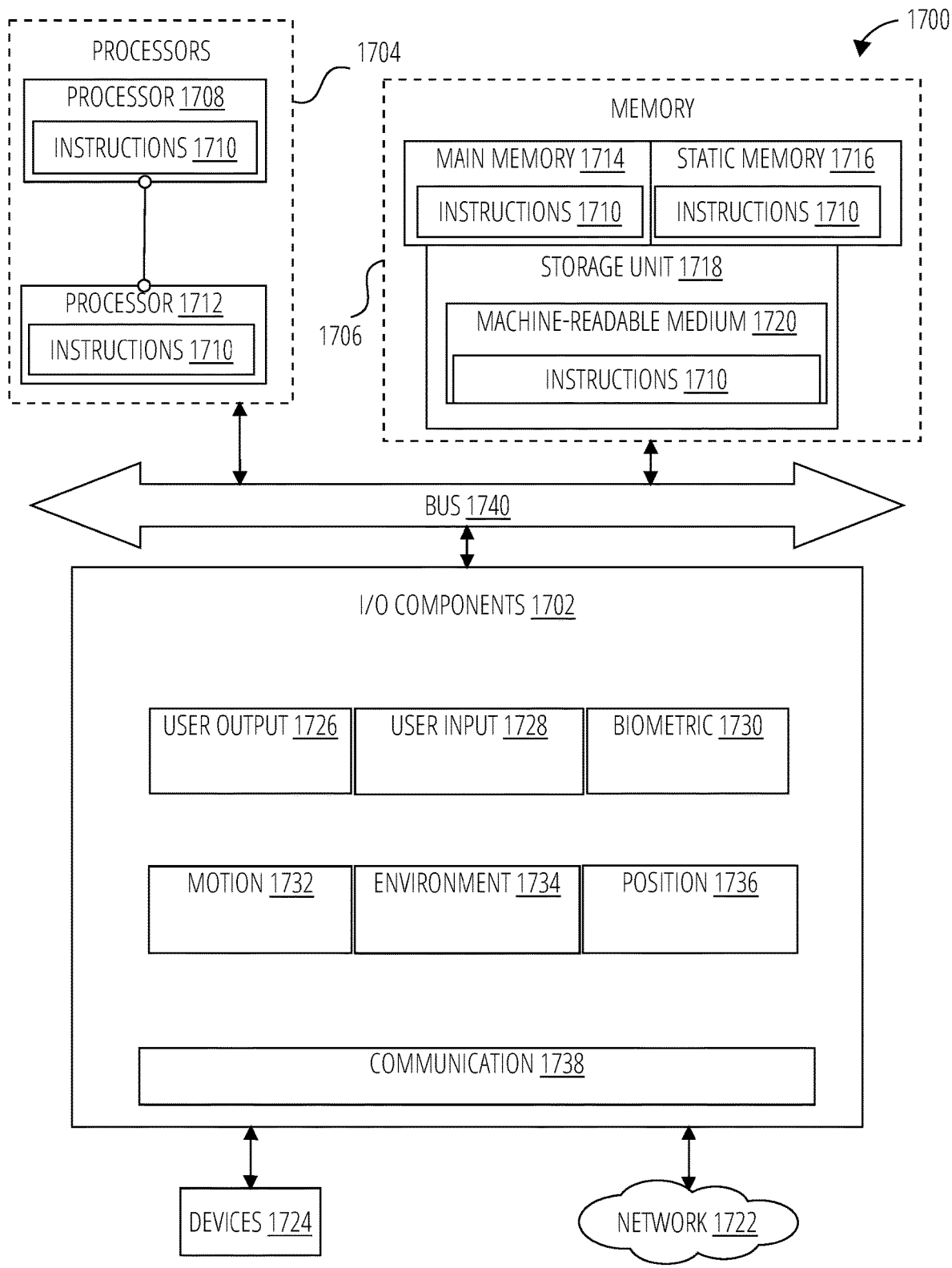
FIG. 17 is a diagrammatic representation of a machine in the form of a computer system within which a set of instructions may be executed for causing the machine to perform any one or more of the methodologies discussed herein, in accordance with some examples.

FIG. 17 is a diagrammatic representation of the machine 1700 (e.g. user device 102) within which instructions 1710 (e.g., software, a program, an application, an applet, an app, or other executable code) for causing the machine 1700 to perform any one or more of the methodologies discussed herein may be executed. For example, the instructions 1710 may cause the machine 1700 to execute any one or more of the methods described herein. The instructions 1710 transform the general, non-programmed machine 1700 into a particular machine 1700 programmed to carry out the described and illustrated functions in the manner described. The machine 1700 may operate as a standalone device or may be coupled (e.g., networked) to other machines. In a networked deployment, the machine 1700 may operate in the capacity of a server machine or a client machine in a server-client network environment, or as a peer machine in a peer-to-peer (or distributed) network environment. The machine 1700 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1710, sequentially or otherwise, that specify actions to be taken by the machine 1700. Further, while only a single machine 1700 is illustrated, the term "machine" shall also be taken to include a collection of machines that individually or jointly execute the instructions 1710 to perform any one or more of the methodologies discussed herein. The machine 1700, for example, may comprise the user device 102 or any one of a number of server devices forming part of the messaging server system 108. In some examples, the machine 1700 may also comprise both client and server systems, with certain operations of a particular method or algorithm being performed on the server-side and with certain operations of the particular method or algorithm being performed on the client-side.

The machine 1700 may include processors 1704, memory 1706, and input/output I/O components 1702, which may be configured to communicate with each other via a bus 1740. In an example, the processors 1704 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1708 and a processor 1712 that execute the instructions 1710. The term "processor" is intended to include multi-core processors that may comprise two or more independent processors (sometimes referred to as "cores") that may execute instructions contemporaneously. Although FIG. 17 shows multiple processors 1704, the machine 1700 may include a single processor with a single-core, a single processor with multiple cores (e.g., a multi-core processor), multiple processors with a single core, multiple processors with multiples cores, or any combination thereof.

The memory 1706 includes a main memory 1714, a static memory 1716, and a storage unit 1718, both accessible to the processors 1704 via the bus 1740. The main memory 1706, the static memory 1716, and storage unit 1718 store the instructions 1710 embodying any one or more of the methodologies or functions described herein. The instructions 1710 may also reside, completely or partially, within the main memory 1714, within the static memory 1716, within machine-readable medium 1720 within the storage unit 1718, within at least one of the processors 1704 (e.g., within the Processor's cache memory), or any suitable combination thereof, during execution thereof by the machine 1700.

The I/O components 1702 may include a wide variety of components to receive input, provide output, produce output, transmit information, exchange information, capture measurements, and so on. The specific I/O components 1702 that are included in a particular machine will depend on the type of machine. For example, portable machines such as mobile phones may include a touch input device or other such input mechanisms, while a headless server machine will likely not include such a touch input device. It will be appreciated that the I/O components 1702 may include many other components that are not shown in FIG. 17. In various examples, the I/O components 1702 may include user output components 1726 and user input components 1728. The user output components 1726 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1728 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1702 may include biometric components 1730, motion components 1732, environmental components 1734, or position components 1736, among a wide array of other components. For example, the biometric components 1730 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1732 include acceleration sensor components (e.g., accelerometer), gravitation sensor components, rotation sensor components (e.g., gyroscope).

The environmental components 1734 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the user device 102 may have a camera system comprising, for example, front cameras on a front surface of the user device 102 and rear cameras on a rear surface of the user device 102. The front cameras may, for example, be used to capture still images and video of a user of the user device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the user device 102 may also include a 360° camera for capturing 360° photographs and videos.

Further, the camera system of a user device 102 may include dual rear cameras (e.g., a primary camera as well as a depth-sensing camera), or even triple, quad or penta rear camera configurations on the front and rear sides of the user device 102. These multiple cameras systems may include a wide camera, an ultra-wide camera, a telephoto camera, a macro camera and a depth sensor, for example.

The position components 1736 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1702 further include communication components 1738 operable to couple the machine 1700 to a network 1722 or devices 1724 via respective coupling or connections. For example, the communication components 1738 may include a network interface Component or another suitable device to interface with the network 1722. In further examples, the communication components 1738 may include wired communication components, wireless communication components, cellular communication components, Near Field Communication (NFC) components, Bluetooth® components (e.g., Bluetooth® Low Energy), Wi-FiR components, and other communication components to provide communication via other modalities. The devices 1724 may be another machine or any of a wide variety of peripheral devices (e.g., a peripheral device coupled via a USB).

Moreover, the communication components 1738 may detect identifiers or include components operable to detect identifiers. For example, the communication components 1738 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1738, such as location via Internet Protocol (IP) geolocation, location via Wi-Fi® signal triangulation, location via detecting an NFC beacon signal that may indicate a particular location, and so forth.

The various memories (e.g., main memory 1714, static memory 1716, and memory of the processors 1704) and storage unit 1718 may store one or more sets of instructions and data structures (e.g., software) embodying or used by any one or more of the methodologies or functions described herein. These instructions (e.g., the instructions 1710), when executed by processors 1704, cause various operations to implement the disclosed examples.

The instructions 1710 may be transmitted or received over the network 1722, using a transmission medium, via a network interface device (e.g., a network interface component included in the communication components 1738) and using any one of several well-known transfer protocols (e.g., hypertext transfer protocol (HTTP)). Similarly, the instructions 1710 may be transmitted or received using a transmission medium via a coupling (e.g., a peer-to-peer coupling) to the devices 1724.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1704 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

The invention claimed is:

1. A method, executed by one or more processors, for providing augmentation effects on a device including a display and at least one camera, the method comprising:
    displaying a video on the display of the device, the video including data specifying camera settings and augmentation effects that were applied to the video;
    displaying a camera effects shortcut with the display of the video;
    displaying an effects indicator with the display of the video;
    based on receipt of user selection of the camera effects shortcut, displaying, on the display, a video feed from the at least one camera with the augmentation effects and camera settings specified by the data applied to the video feed; and based on receipt of user selection of the effects indicator, providing a call to action user interface element, selection of which displays a video feed from the at least one camera with the augmentation effects specified by the data applied to the video feed but without applying the camera settings specified by the data.

2. The method of claim 1, wherein the effects indicator identifies a name and creator of the augmentation effects.

3. The method of claim 2, further comprising:
receiving selection of the effects indicator;
displaying information on the augmentation effects; and
displaying the call to action user interface element for a user to apply the augmentation effects to the video feed.

4. The method of claim 1, further comprising:
displaying, with the video, a context indicator identifying an audio track playing with the video;
receiving user selection of the context indicator; and
based on receiving user selection of the context indicator, displaying further information relating to the audio track.

5. The method of claim 1, further comprising:
displaying a confirmation user interface item prior to displaying the video feed from the at least one camera with the augmentation effects and camera settings;
receiving selection of the confirmation user interface item; and
based on receiving selection of the confirmation user interface item, displaying the video feed from the at least one camera with the augmentation effects and camera settings.

6. The method of claim 2, further comprising:
displaying, with the video, a context indicator identifying an audio track playing with the video.

7. A computing device comprising:
at least one camera;
a display;
one or more processors; and
a memory storing instructions that, when executed by the one or more processors, configure the device to perform operations for providing augmentation effects, the operations comprising:
displaying a video on the display of the device, the video including data specifying camera settings and augmentation effects that were applied to the video;
displaying a camera effects shortcut with the display of the video;
displaying an effects indicator with the display of the video;
based on receipt of user selection of the camera effects shortcut, displaying, on the display, a video feed from the at least one camera with the augmentation effects and camera settings specified by the data applied to the video feed; and
based on receipt of user selection of the effects indicator, providing a call to action user interface element, selection of which displays a video feed from the at least one camera with the augmentation effects specified by the data applied to the video feed but without applying the camera settings specified by the data.

8. The computing device of claim 7, wherein the effects indicator identifies a name and creator of the augmentation effects.

9. The computing device of claim 8, wherein the operations further comprise:
receiving selection of the effects indicator;
displaying information on the augmentation effects; and
displaying the call to action user interface element for a user to apply the augmentation effects to the video feed.

10. The computing device of claim 7, wherein the operations further comprise:
displaying, with the video, a context indicator identifying an audio track playing with the video;
receiving user selection of the context indicator; and
based on receiving user selection of the context indicator, displaying further information relating to the audio track.

11. The computing device of claim 7, wherein the operations further comprise:
displaying a confirmation user interface item prior to displaying the video feed from the at least one camera with the augmentation effects and camera settings;
receiving selection of the confirmation user interface item; and
based on receiving selection of the confirmation user interface item, displaying the video feed from the at least one camera with the augmentation effects and camera settings.

12. The computing device of claim 8, wherein the operations further comprise:
displaying, with the video, a context indicator identifying an audio track playing with the video.

13. A non-transitory computer-readable storage medium, the computer-readable storage medium including instructions that when executed by a computer, cause the computer to perform operations for providing augmentation effects on a device including a display and at least one camera, the operations comprising:
displaying a video on the display of the device, the video including data specifying camera settings and augmentation effects that were applied to the video;
displaying a camera effects shortcut with the display of the video, the camera effects shortcut being associated with the augmentation effects and camera settings;
displaying an effects indicator with the display of the video, the effects indicator being associated with the augmentation effects;
based on receipt of user selection of the camera effects shortcut, displaying, on the display, a modified video feed from the at least one camera in which the augmentation effects and camera settings associated with the camera effects shortcut have been applied; and
based on receipt of user selection of the effects indicator, providing a call to action user interface element, selection of which displays a video feed from the at least one camera with the augmentation effects specified by the data applied to the video feed but without applying the camera settings specified by the data.

14. The computer-readable storage medium device of claim 13, wherein the effects indicator identifies a name and creator of the augmentation effects.

15. The computer-readable storage medium of claim 14, wherein the operations further comprise:
receiving selection of the effects indicator;
displaying information on the augmentation effects; and
displaying the call to action user interface element for a user to apply the augmentation effects to the video feed.

16. The computer-readable storage medium of claim 13, wherein the operations further comprise:

displaying, with the video, a context indicator identifying an audio track playing with the video;

receiving user selection of the context indicator; and based on receiving user selection of the context indicator, displaying further information relating to the audio track.

17. The computer-readable storage medium of claim 13, wherein the operations further comprise:

displaying a confirmation user interface item prior to displaying the video feed from the at least one camera with the augmentation effects and camera settings;

receiving selection of the confirmation user interface item; and based on receiving selection of the confirmation user interface item, displaying the video feed from the at least one camera with the augmentation effects and camera settings.

\* \* \* \* \*